(12) United States Patent
Noda et al.

(10) Patent No.: US 10,168,511 B2
(45) Date of Patent: Jan. 1, 2019

(54) IMAGING LENS AND IMAGING APPARATUS

(71) Applicant: FUJIFILM Corporation, Tokyo (JP)

(72) Inventors: Taiga Noda, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 137 days.

(21) Appl. No.: 15/421,533

(22) Filed: Feb. 1, 2017

(65) Prior Publication Data
US 2017/0227746 A1 Aug. 10, 2017

(30) Foreign Application Priority Data
Feb. 8, 2016 (JP) .................. 2016-021989

(51) Int. Cl.
| G02B 13/18 | (2006.01) |
| G02B 9/64 | (2006.01) |
| G02B 13/06 | (2006.01) |
| B60R 1/00 | (2006.01) |

(52) U.S. Cl.
CPC ........... *G02B 13/18* (2013.01); *G02B 9/64* (2013.01); *G02B 13/06* (2013.01); *B60R 1/00* (2013.01); *B60R 2300/802* (2013.01)

(58) Field of Classification Search
CPC .......... G02B 13/18; G02B 9/64; G02B 13/06; B60R 1/00; B60R 2300/802

USPC ........................................ 359/740
See application file for complete search history.

(56) References Cited

FOREIGN PATENT DOCUMENTS

JP   2004-093593 A   3/2004

OTHER PUBLICATIONS

H. Sato, "Zoom Lens", JP2004093593, machine translation.*

* cited by examiner

*Primary Examiner* — Wen Huang
(74) *Attorney, Agent, or Firm* — Studebaker & Brackett PC

(57) ABSTRACT

An imaging lens is constituted by, in order from the object side to the image side: a first lens group; a stop; and a second lens group having a positive refractive power. The first lens group is constituted by, in order from the object side to the image side: one or two negative meniscus lenses, a biconcave lens, and a biconvex lens. The second lens group is constituted by, in order from the object side to the image side: a 2A lens group having a positive refractive power as a whole, constituted by a positive lens, a negative lens, and a positive lens; and a 2B lens group having a positive refractive power as a whole, constituted by a positive lens, a negative lens, and a positive lens. A predetermined conditional formula is satisfied.

12 Claims, 19 Drawing Sheets

EXAMPLE 1

FIG.1  EXAMPLE 1

FIG.2 EXAMPLE 2

FIG.3  EXAMPLE 3

FIG.4   EXAMPLE 4

FIG.5  EXAMPLE 5

FIG.6  EXAMPLE 6

EXAMPLE 7

FIG.8   EXAMPLE 8

FIG.9  EXAMPLE 9

FIG.14 EXAMPLE 5

IMAGING LENS AND IMAGING APPARATUS

CROSS REFERENCE TO RELATED APPLICATIONS

The present application claims priority under 35 U.S.C. § 119 to Japanese Patent Application No. 2016-021989 filed on Feb. 8, 2016. The above application is hereby expressly incorporated by reference in its entirety, into the present application.

BACKGROUND

The present disclosure is related to an imaging lens which can be favorably utilized in a vehicle mounted camera, a surveillance camera, etc., and to an imaging apparatus equipped with this imaging lens.

Known imaging lenses for use in vehicle mounted cameras, surveillance cameras, etc. are disclosed in Japanese Unexamined Patent Publication No. 2004-093593. Japanese Unexamined Patent Publication No. 2004-093593 discloses an imaging lens that includes, in order from the object side to the image side, a front group, a stop, and a rear group, and is constituted by 11 lenses as a whole.

SUMMARY

It is necessary for imaging lenses to be used in vehicle mounted cameras, surveillance cameras, etc. to image wide ranges. Therefore, there is demand for angles of view which are wide to a certain degree. However, the lenses disclosed in Japanese Unexamined Patent Publication No. 2004-093593 all have full angles of view of 93° or less, and lenses having wide angles of view are desired.

In addition, the F numbers of the lenses disclosed in Japanese Unexamined Patent Publication No. 2004-093593 are all 2.9 or greater, and there is desire for lenses having smaller F numbers. Further, lenses that more favorably correct various aberrations are desired.

The present disclosure has been developed in view of the foregoing circumstances. The present disclosure provides an imaging lens having a wide angle of view and a small F number, that favorably corrects various aberrations, as well as an imaging apparatus equipped with the imaging lens.

An imaging lens of the present disclosure consists of, in order from the object side to the image side:

a first lens group;
a stop; and
a second lens group having a positive refractive power;
the first lens group consisting of, in order from the object side to the image side:
one or two negative meniscus lenses having a concave surface toward the image side;
a biconcave lens; and
a biconvex lens;
the second lens group consisting of, in order from the object side to the image side:
a 2A lens group having a positive refractive power as a whole, consisting of a 2-1 positive lens, a 2-2 negative lens, and a 2-3 positive lens; and
a 2B lens group having a positive refractive power as a whole, consisting of a 2-4 positive lens, a 2-5 negative lens, and a 2-6 positive lens; and
Conditional Formula (1) below being satisfied. Note that it is preferable for Conditional Formula (1-1) to be satisfied.

$$0.5 < f2B/f2A < 2 \tag{1}$$

$$0.7 < f2B/f2A < 1.8 \tag{1-1}$$

wherein f2B is the focal length of the 2B lens group, and f2A is the focal length of the 2A lens group.

In the imaging lens of the present disclosure, it is preferable for the 2-3 positive lens to be a positive lens having a convex surface toward the image side, and for the 2-4 positive lens to be a positive lens having a convex surface toward the object side.

In addition, it is preferable for the 2-2 negative lens and the 2-3 positive lens to be cemented together, and for the shape of the coupling surface of the cemented lens to be convex toward the object side.

In addition, it is preferable for the 2-5 negative lens and the 2-6 positive lens to be cemented together, and for the shape of the coupling surface of the cemented lens to be convex toward the object side.

In addition, it is preferable for Conditional Formula (2) below to be satisfied, and more preferable for Conditional Formula (2-1) below to be satisfied.

$$0 < \beta 2B < 0.95 \tag{2}$$

$$0.2 < \beta 2B < 0.8 \tag{2-1}$$

wherein β2B is the transverse magnification of the 2B lens group.

In addition, it is preferable for Conditional Formula (3) below to be satisfied, and more preferable for Conditional Formula (3-1) below to be satisfied.

$$-1 < f2/f1 < 0.5 \tag{3}$$

$$-0.8 < f2/f1 < 0.3 \tag{3-1}$$

wherein f2 is the focal length of the second lens group, and f1 is the focal length of the first lens group.

In addition, it is preferable for Conditional Formula (4) below to be satisfied, and more preferable for Conditional Formula (4-1) below to be satisfied.

$$0 < (L24f + L23r)/(L24f - L23r) < 0.5 \tag{4}$$

$$0 < (L24f + L23r)/(L24f - L23r) < 0.4 \tag{4-1}$$

wherein L24f is the radius of curvature of the surface toward the object side of the 2-4 positive lens, and L23r is the radius of curvature of the surface toward the image side of the 2-3 positive lens.

An imaging apparatus of the present disclosure is equipped with the imaging lens of the present disclosure.

Note that the above expression "consists of" means that lenses that practically have no power, optical elements other than lenses such as a stop, a cover glass, and filters, and mechanical components such as lens flanges, a lens barrel, an imaging element, a camera shake correcting mechanism, etc. may be included, in addition to the constituent elements listed above.

Note that the surface shapes, the radii of curvature, and/or the signs of the refractive powers of lenses in the above lens are those which are considered in the paraxial region for lenses that include aspherical surfaces.

The imaging lens of the present disclosure consists of, in order from the object side to the image side: the first lens group; the stop; and the second lens group having a positive refractive power. The first lens group consists of, in order from the object side to the image side: one or two negative meniscus lenses having a concave surface toward the image side; a biconcave lens; and a biconvex lens. The second lens group consists of, in order from the object side to the image side: a 2A lens group having a positive refractive power as a whole, consisting of a 2-1 positive lens, a 2-2 negative lens, and a 2-3 positive lens; and a 2B lens group having a positive refractive power as a whole, consisting of a 2-4 positive lens, a 2-5 negative lens, and a 2-6 positive lens. In addition, Conditional Formula (1) below is satisfied. Therefore, it is possible for the imaging lens to have a wide angle of view and a small F number, and favorably correct various aberrations.

$$0.5 < f2B/f2A < 2 \tag{1}$$

In addition, the imaging apparatus of the present disclosure is equipped with the imaging lens of the present disclosure. Therefore, the imaging apparatus has a wide angle of view and is capable of obtaining bright images having high image quality.

DETAILED DESCRIPTION OF THE PREFERRED EMBODIMENTS

Figure 1:
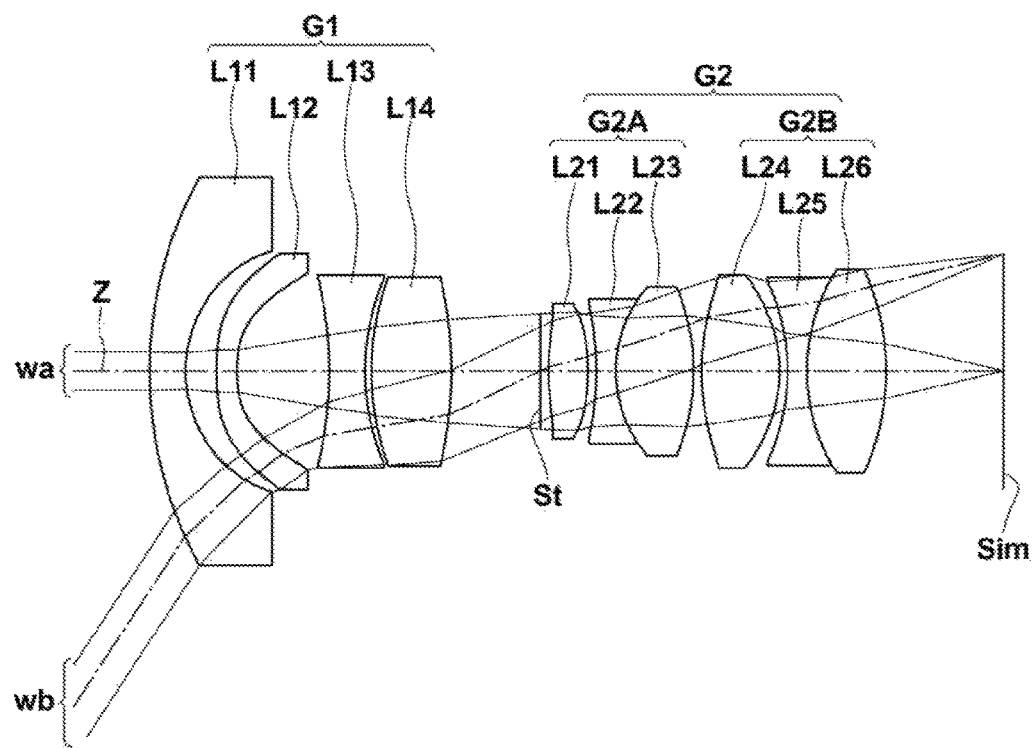
FIG. 1 is a collection of sectional diagrams that illustrate the lens configuration of an imaging lens according to an embodiment of the present disclosure (common with Example 1).

Hereinafter, embodiments of the present disclosure will be described in detail with reference to the attached drawings. FIG. 1 is a cross sectional diagram that illustrates the lens configuration of an imaging lens according to an embodiment of the present disclosure. The example of the configuration illustrated in FIG. 1 corresponds to the configuration of an imaging lens of Example 1 to be described later. In FIG. 1, the left side is the object side, and the right side is the image side. The aperture stop St illustrated in FIG. 1 does not necessarily represent the size and/or the shape thereof, but the position of the stop along an optical axis Z. In addition, FIG. 1 also illustrates the optical paths of an axial light beam wa and a light beam wb at a maximum angle of view.

As illustrated in FIG. 1, the imaging lens 1 is constituted by, in order from the object side to the image side, a first lens group G1, the aperture stop St, and a second lens group G2 having a positive refractive power. The incident angle of off axis light beams with respect to an image formation plane Sim can be suppressed, by adopting such a configuration.

The first lens group G1 is constituted by, in order from the object side to the image side: one or two negative meniscus lenses having a concave surface toward the image side, a biconcave lens, and a biconvex lens.

By positioning the negative meniscus lens most toward the object side, the angle of off axis light rays that enter the lens groups more toward the image side than the negative meniscus lens can be reduced. In addition, the negative meniscus shape having the concave surface toward the image side can suppress the generation of distortion. In the case that two negative meniscus lenses are provided consecutively, such a configuration is more advantageous from the viewpoint of correcting distortion. Note that there is a tendency for the radii of negative meniscus lenses to increase if three or more negative meniscus lenses are provided consecutively. Therefore, it is advantageous to maintain the number of negative meniscus lenses to two or fewer, from the viewpoint of decreasing the radius of the lens.

In addition, a positive lens is not positioned between the negative meniscus lens and the biconcave lens. Therefore, it is not necessary to impart excessively strong refractive powers to the negative meniscus lenses. As a result, the generation of off axis higher order aberrations can be suppressed, and this configuration is also advantageous from the viewpoint of widening the angle of view.

In addition, the biconcave lens exhibits the effects of suppressing the generation of excessively corrected spherical aberration and imparting negative refractive power. Such a configuration is advantageous from the viewpoints of widening the angle of view and securing back focus.

In addition, the biconvex lens exhibits the effects of correcting distortion and lateral chromatic aberration, while decreasing the incident angles of marginal axial light rays that enter the second lens group G2, to suppress the generation of spherical aberration.

Note that FIG. 1 illustrates an example in which the first lens group G1 is constituted by: a negative meniscus lens L11, a negative meniscus lens L12, a biconcave lens L13, and a biconvex lens L14.

The second lens group G2 is constituted by, in order from the object side to the image side, a 2A lens group G2A having a positive refractive power as a whole, consisting of a 2-1 positive lens L21, a 2-2 negative lens L22, and a 2-3 positive lens L23, and a 2B lens group G2B having a positive refractive power as a whole, consisting of a 2-4 positive lens L24, a 2-5 negative lens L25, and a 2-6 positive lens L26.

By dividing the second lens group G2 into two lens groups having positive refractive powers, which are the 2A lens group G2A and the 2B lens group G2B, the generation of spherical aberration can be suppressed. In addition, by these lens groups being of a three lens configuration constituted by a positive lens, a negative lens, and a positive lens, various aberrations which are generated within each of the lens groups, such as longitudinal chromatic aberration, lateral chromatic aberration, spherical aberration, and astigmatism, can be favorably corrected.

Further, the imaging lens is configured such that Conditional Formula (1) is satisfied. By configuring the imaging lens such that the value of f2B/f2A is not less than or equal to the lower limit defined in Conditional Formula (1), positive refractive power is appropriately distributed between the 2A lens group G2A and the 2B lens group G2B. As a result, the generation of spherical aberration and astigmatism can be suppressed. By configuring the imaging lens such that the value of f2B/f2A is not greater than or equal to the upper limit defined in Conditional Formula (1), the incident angle of off axis light rays with respect to the image formation plane Sim can be suppressed. Note that more favorable properties can be obtained if Conditional Formula (1-1) is satisfied.

$$0.5 < f2B/f2A < 2 \tag{1}$$

$$0.7 < f2B/f2A < 1.8 \tag{1-1}$$

wherein f2B is the focal length of the 2B lens group, and f2A is the focal length of the 2A lens group.

In the imaging lens of the present embodiment, it is preferable for the 2-3 positive lens L23 to be a positive lens having a convex surface toward the image side, and for the 2-4 positive lens L24 to be a positive lens having a convex surface toward the object side. In this manner, by an air lens between the 2-3 positive lens L23 and the 2-4 positive lens L24 having positive refractive power and by the surface toward the object side of the 2-4 positive lens L24 being a convex surface, the heights of light rays at peripheral angles of view that enter the 2-4 positive lens L24 will increase, and the influence of positive refractive power will become stronger. As a result, the angles at which light rays at peripheral angles of view enter the image formation plane Sim can be decreased.

In addition, it is preferable for the 2-2 negative lens L22 and the 2-3 positive lens L23 to be cemented together, and for the shape of the coupling surface between the two to be convex toward the object side. This configuration enables the generation of astigmatism to be suppressed and is advantageous from the viewpoint of correcting lateral chromatic aberration.

In addition, it is preferable for the 2-5 negative lens L25 and the 2-6 positive lens L26 to be cemented together, and for the shape of the coupling surface between the two to be convex toward the object side. This configuration enables the generation of astigmatism to be suppressed and is advantageous from the viewpoint of correcting lateral chromatic aberration.

In addition, it is preferable for Conditional Formula (2) below to be satisfied. By configuring the imaging lens such that the value of $\beta 2B$ is not less than or equal to the lower limit defined in Conditional Formula (2), and by the transverse magnification of the 2B lens group G2B being a positive magnification, the burden of the 2B lens group G2B with respect to bearing refractive power can be decreased, and therefore the generation of spherical aberration at the 2B lens group G2B can be suppressed. In addition, the 2B lens group G2B is further from the aperture stop St than the 2A lens group G2A, and the heights of off axis light rays that enter the 2B lens group G2B are higher. Therefore, various off axis aberrations can be controlled during design of the imaging lens. At this time, that the burden of spherical aberration is small means that achieving balance between off axis and axial aberrations is facilitated. By configuring the imaging lens such that the value of $\beta 2B$ is not greater than or equal to the upper limit defined in Conditional Formula (2), the burden of the 2A lens group G2A with respect to bearing refractive power can be decreased, and therefore the generation of spherical aberration can be suppressed. Note that more favorable properties can be obtained if Conditional Formula (2-1) is satisfied.

$$0 < \beta 2B < 0.95 \tag{2}$$

$$0.2 < \beta 2B < 0.8 \tag{2-1}$$

wherein $\beta 2B$ is the transverse magnification of the 2B lens group.

In addition, it is preferable for Conditional Formula (3) below to be satisfied. By configuring the imaging lens such that the value of f2/f1 is not less than or equal to the lower limit defined in Conditional Formula (3), the generation of spherical aberration at the second lens group G2 can be suppressed. Configuring the imaging lens such that the value of f2/f1 is not greater than or equal to the upper limit defined in Conditional Formula (3) is advantageous from the viewpoint of widening the angle of view, and also enables back focus to be secured. Note that more favorable properties can be obtained if Conditional Formula (3-1) is satisfied.

$$-1 < f2/f1 < 0.5 \tag{3}$$

$$-0.8 < f2/f1 < 0.3 \tag{3-1}$$

wherein f2 is the focal length of the second lens group, and f1 is the focal length of the first lens group.

In addition, it is preferable for Conditional Formula (4) below to be satisfied. By configuring the imaging lens such that the value of (L24f+L23r)/(L24f−L23r) is not less than or equal to the lower limit defined in Conditional Formula (4), the generation of astigmatism and distortion can be suppressed. By configuring the imaging lens such that the value of (L24f+L23r)/(L24f−L23r) is not greater than or equal to the upper limit defined in Conditional Formula (4), the incident angles of off axis light rays with respect to the image formation plane Sim can be suppressed. Note that more favorable properties can be obtained if Conditional Formula (4-1) is satisfied.

$$0 < (L24f+L23r)/(L24f-L23r) < 0.5 \tag{4}$$

$$0 < (L24f+L23r)/(L24f-L23r) < 0.4 \tag{4-1}$$

wherein L24f is the radius of curvature of the surface toward the object side of the 2-4 positive lens, and L23r is the radius of curvature of the surface toward the image side of the 2-3 positive lens.

It is preferable for a protective multiple layer film coating to be administered in the case that the present imaging lens is to be utilized in extreme environments. Further, an antireflection coating may be administered in addition to the protective coating, in order to reduce ghost light and the like during utilization of the imaging lens.

In addition, in the case that this imaging lens is applied to an imaging apparatus, a cover glass, prisms, and/or various filters, such as an infrared cutoff filter and a low pass filter, may be provided between the lens system and the image formation plane Sim, depending on the configuration of the imaging apparatus. Note that these filters may be provided among the lenses instead of being provided between the lens system and the image formation plane Sim. As a further alternative, coatings that exhibit the same effects as these filters may be administered on the lens surfaces of the lenses.

Next, examples of numerical values of the imaging lens of the present disclosure will be described.

First, an imaging lens of Example 1 will be described. FIG. 1 is a cross sectional diagram that illustrates the lens configuration of the imaging lens of Example 1. Note that in FIG. 1 and FIGS. 2 through 9 that correspond to Examples 2 through 9 to be described later, the left side is the object side, the right side is the image side, and the aperture stops St illustrated therein do not necessarily represent the sizes and shapes thereof, but only the positions thereof along the optical axis Z.

Basic lens data are shown in Table 1, data related to various items are shown in Table 2, and data related to aspherical surface coefficients are shown in Table 3 for the imaging lens of Example 1. The meanings of the symbols in the tables will be described below with those for Example 1 as an example. However, the meanings of the symbols are basically the same for Examples 2 through 9.

In the lens data of Table 1, surface numbers that sequentially increase from the object side to the image side, with the surface toward the object side of the constituent element at the most object side designated as first, are shown in the column Surface Number. The radii of curvature of each surface are shown in the column Radius of Curvature. The distances between each surface and a next surface are shown in the column Distance. The refractive indices with respect to the d line (wavelength: 587.6 nm) of each optical element are shown in the column Nd. The Abbe's numbers with respect to the d line (wavelength: 587.6 nm) of each optical element are shown in the column vd. The partial dispersion ratios of each optical element are shown in the column θgF.

Note the partial dispersion ratio (θgF) is represented by the formula below.

$$\theta gF=(ng-nF)/(nF-nC)$$

wherein ng is the refractive index with respect to the g line, nF is the refractive index with respect to the F line, and nC is the refractive index with respect to the C line.

Here, the signs of the radii of curvature are positive in cases that the surface shape is convex toward the object side, and negative in cases that the surface shape is convex toward the image side. Table 1 also shows data regarding the aperture stop St. Text reading "(stop)" is indicated along with a surface number in the column of the surface number at the surface corresponding to the aperture stop.

The values of the focal length f' of the entire lens system, the back focus Bf', the F number F No., and the full angle of view 2ω are shown as data related to various items in Table 2.

In the data shown in each of the tables below, degrees are used as the units for angles and mm are used as the units for lengths. However, it is possible for optical systems to be proportionately enlarged or proportionately reduced and utilized. Therefore, other appropriate units may be used.

In the lens data of Table 1, the surface numbers of aspherical surfaces are appended with the mark "*", and numerical values that represent paraxial radii of curvature are shown as the radii of curvature of the aspherical surfaces. Table 3 shows aspherical surface coefficients related to these aspherical surfaces. In Table 3, "E±n" (n is an integer) means that the numerical values are multiplied by $10^{\pm n}$. The aspherical surface coefficients are the values of the coefficients KA and Am (m=3-12) in the aspherical surface formula below.

$$Zd = \frac{C \times h^2}{1 + \sqrt{1 - KA \times C^2 \times h^2}} + \sum_m Am \times h^m$$

wherein Zd is the depth of the aspherical surface (the length of a normal line that extends from a point on the aspherical surface at a height h to a plane perpendicular to the optical axis that contacts the apex of the aspherical surface), h is the height (the distance from the optical axis), C is the inverse of the paraxial radius of curvature, and KA and Am are aspherical surface coefficients (m=3~12).

TABLE 1

Example 1: Lens Data

| Surface Number | Radius of Curvature | Distance | nd | vd | θgF |
|---|---|---|---|---|---|
| 1 | 10.65187 | 1.014 | 1.75500 | 52.32 | 0.54765 |
| 2 | 3.43523 | 0.901 | | | |
| *3 | 13.59259 | 0.563 | 1.74330 | 49.33 | 0.55274 |
| *4 | 3.90267 | 2.608 | | | |
| 5 | −10.54914 | 1.014 | 1.59282 | 68.62 | 0.54414 |
| 6 | 6.30953 | 0.180 | | | |
| 7 | 7.23031 | 2.254 | 1.88300 | 40.76 | 0.56679 |
| 8 | −10.82272 | 2.547 | | | |
| 9 (stop) | ∞ | 0.225 | | | |
| *10 | 7.09771 | 1.112 | 1.59201 | 67.02 | 0.53589 |
| *11 | −5.44854 | 0.225 | | | |
| 12 | −8.64471 | 0.563 | 1.80400 | 46.58 | 0.55730 |
| 13 | 3.44572 | 2.190 | 1.49700 | 81.54 | 0.53748 |
| 14 | −5.77768 | 0.225 | | | |
| *15 | 6.10010 | 2.206 | 1.49710 | 81.56 | 0.53848 |
| *16 | −3.56699 | 0.225 | | | |
| 17 | −5.56614 | 0.563 | 1.80400 | 46.58 | 0.55730 |
| 18 | 5.03020 | 2.235 | 1.49700 | 81.54 | 0.53748 |
| 19 | −6.50113 | 3.316 | | | |

TABLE 2

Example 1: Items

| | |
|---|---|
| f' | 2.430 |
| Bf' | 3.316 |
| FNo. | 2.30 |
| 2ω [°] | 111.8 |

TABLE 3

Example 1: Aspherical Surface Coefficients

| | Surface Number | | |
|---|---|---|---|
| | 3 | 4 | 10 |
| KA | 1.0000000E+00 | −5.1420408E+00 | 1.0000000E+00 |
| A3 | 7.8080107E−18 | 1.0178207E−03 | 2.4833926E−17 |

TABLE 3-continued

Example 1: Aspherical Surface Coefficients

| | | | |
|---|---|---|---|
| A4 | 4.3766915E−02 | 5.6192121E−02 | −3.5120983E−03 |
| A5 | −1.1626420E−02 | −5.1427741E−04 | −3.1293085E−03 |
| A6 | −3.4204537E−03 | −1.2725928E−02 | 2.6779953E−03 |
| A7 | 1.8948308E−03 | 2.4806158E−03 | −2.9252930E−03 |
| A8 | 2.3585042E−04 | 2.5270711E−03 | 1.2749621E−03 |
| A9 | −2.0849159E−04 | −1.0845483E−03 | 1.0079888E−03 |
| A10 | −1.7556099E−06 | −7.0602398E−05 | −2.3104476E−03 |
| A11 | 1.2971052E−05 | 9.6767421E−05 | 1.4106915E−03 |
| A12 | −1.6260427E−06 | −1.3417545E−05 | −3.1269940E−04 |

| | Surface Number | | |
|---|---|---|---|
| | 11 | 15 | 16 |
| KA | 1.0000000E+00 | 1.0000000E+00 | 1.0000000E+00 |
| A3 | 7.0470218E−19 | −4.7321421E−18 | 9.4642841E−18 |
| A4 | −4.6725899E−03 | −3.1642839E−03 | 4.2630474E−03 |
| A5 | 4.5290302E−03 | 2.5200367E−03 | −1.1342408E−03 |
| A6 | −9.5743491E−03 | −6.0142283E−04 | 4.4157980E−03 |
| A7 | 4.1638547E−03 | −1.7534067E−03 | −5.0484162E−03 |
| A8 | 5.1043092E−03 | 1.5354013E−03 | 1.9781868E−03 |
| A9 | −6.6750702E−03 | −2.9845632E−04 | 3.3416724E−04 |
| A10 | 2.2488318E−03 | −1.5677231E−04 | −5.3466551E−04 |
| A11 | 7.4830577E−05 | 8.1179518E−05 | 1.6554370E−04 |
| A12 | −1.2840299E−04 | −1.0661407E−05 | −1.7438084E−05 |

Figure 10:
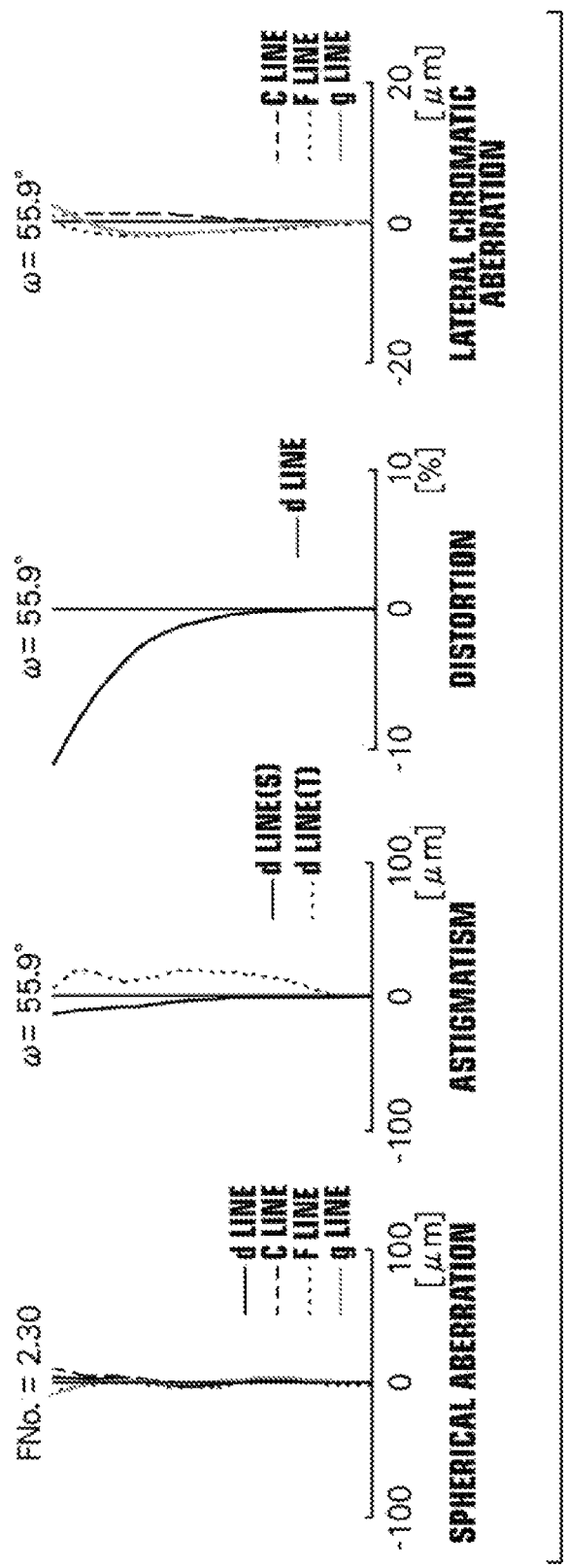
FIG. 10 is a collection of diagrams that illustrate aberrations of the imaging lens according to Example 1.

FIG. 10 is a collection of diagrams that illustrate various aberrations of the imaging lens of Example 1. Note that in FIG. 10, diagrams that illustrate spherical aberration, astigmatism, distortion, and lateral chromatic aberration are illustrated in this order from the left side of the drawing sheet. These aberration diagrams illustrate aberrations in a state when the object distance is infinity. The diagram that illustrates spherical aberration shows aberrations related to the d line (wavelength: 587.6 nm), the C line (wavelength: 656.3 nm), the F line (wavelength: 486.1 nm), and the g line (wavelength: 435.8 nm) as a solid line, a long broken line, a short broken line, and a gray solid line, respectively. In the diagram that illustrates astigmatism, aberrations in the sagittal direction and aberrations in the tangential direction are indicated by a solid line and a dotted line, respectively. In the diagram that illustrates lateral chromatic diagram, aberrations related to the C line (wavelength: 656.3 nm), the F line (wavelength: 486.1 nm), and the g line (wavelength: 435.8 nm) are shown as a long broken line, a dotted line, and a gray solid line, respectively. In the diagram that illustrates spherical aberration, "FNo." denotes the F number. In the other diagrams that illustrate the aberrations, ω denotes half angles of view.

The symbols, the meanings, and the manners in which the various pieces of data are described in the description of Example 1 above are the same for the examples to be described below unless otherwise noted. Therefore, redundant descriptions will be omitted hereinafter.

Figure 2:
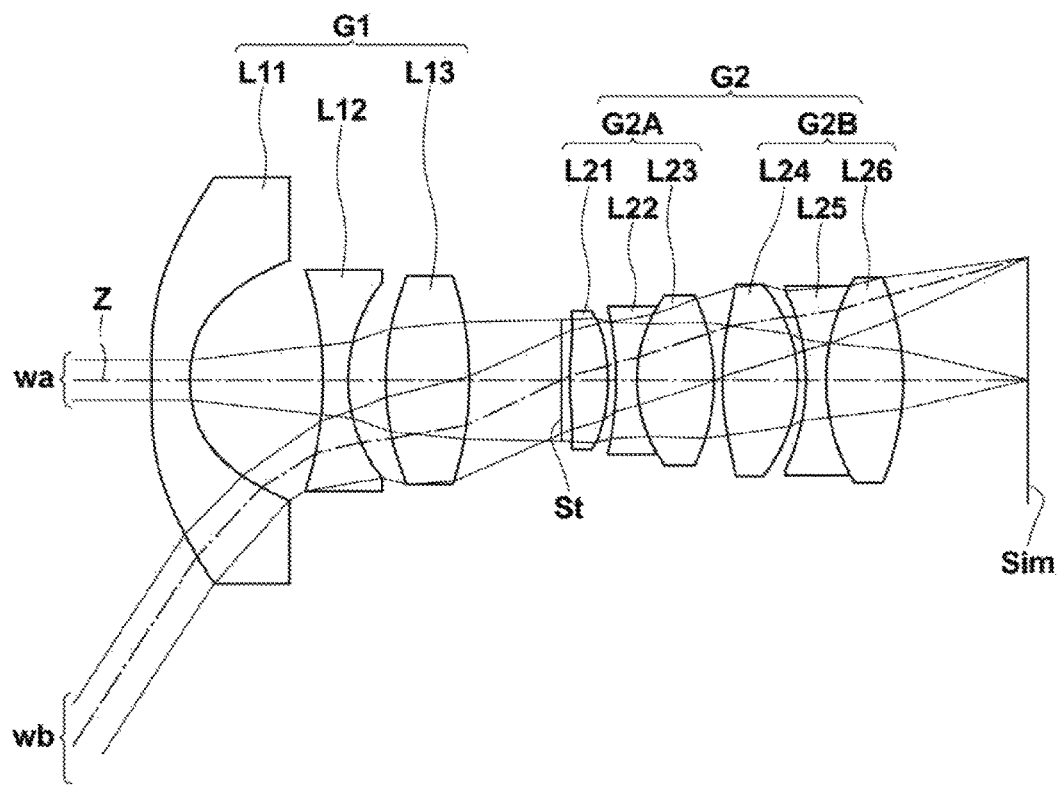
FIG. 2 is a cross sectional diagram that illustrates the lens configuration of an imaging lens according to Example 2 of the present disclosure.
Figure 11:
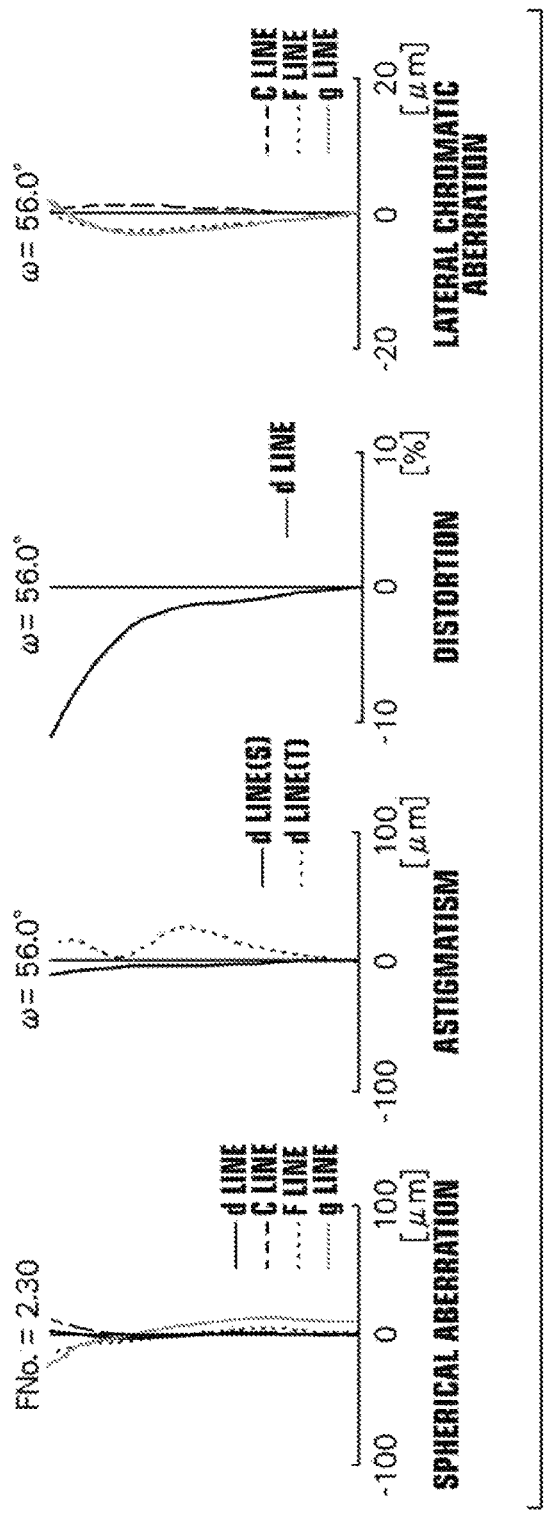
FIG. 11 is a collection of diagrams that illustrate aberrations of the imaging lens according to Example 2.

Next, an imaging lens of Example 2 will be described. FIG. 2 is a cross sectional diagram that illustrates the lens configuration of the imaging lens of Example 2. Basic lens data are shown in Table 4, data related to various items are shown in Table 5, and aspherical surface coefficients are shown in Table 6 for the imaging lens of Example 2. In addition, FIG. 11 is a collection of diagrams that illustrate various aberrations of the imaging lens of Example 2.

TABLE 4

Example 2: Lens Data

| Surface Number | Radius of Curvature | Distance | nd | vd | θgF |
|---|---|---|---|---|---|
| *1 | 74.82011 | 1.036 | 1.72903 | 54.04 | 0.54474 |
| *2 | 3.52114 | 3.606 | | | |
| 3 | −8.89167 | 0.676 | 1.59282 | 68.62 | 0.54414 |
| 4 | 4.00613 | 1.014 | | | |
| 5 | 6.77182 | 2.254 | 1.77250 | 49.60 | 0.55212 |
| 6 | −8.41545 | 2.505 | | | |
| 7 (stop) | ∞ | 0.225 | | | |
| *8 | 9.53269 | 1.020 | 1.59201 | 67.02 | 0.53589 |
| *9 | −5.17381 | 0.225 | | | |
| 10 | −7.86955 | 0.563 | 1.80400 | 46.58 | 0.55730 |
| 11 | 3.67163 | 2.073 | 1.49700 | 81.54 | 0.53748 |
| 12 | −4.92777 | 0.225 | | | |
| *13 | 6.66125 | 2.023 | 1.49710 | 81.56 | 0.53848 |
| *14 | −3.65311 | 0.225 | | | |
| 15 | −5.20957 | 0.563 | 1.80400 | 46.58 | 0.55730 |
| 16 | 5.03328 | 2.073 | 1.49700 | 81.54 | 0.53748 |
| 17 | −6.78211 | 3.359 | | | |

TABLE 5

Example 2: Items

| | |
|---|---|
| f | 2.426 |
| Bf | 3.359 |
| FNo. | 2.30 |
| 2ω [°] | 112.0 |

TABLE 6

Example 2: Aspherical Surface Coefficients

| | Surface Number | | |
|---|---|---|---|
| | 1 | 2 | 8 |
| KA | 1.0000000E+00 | −5.0000000E+00 | 1.0000000E+00 |
| A3 | 0.0000000E+00 | 1.2235998E−03 | 1.4190815E−17 |
| A4 | 9.3673939E−03 | 2.5975530E−02 | −5.2241993E−03 |
| A5 | −7.3496643E−04 | 4.5268034E−03 | −6.2864462E−03 |
| A6 | −6.0120115E−04 | −6.3188633E−03 | 6.0054301E−03 |
| A7 | 7.7617280E−05 | 1.4361460E−04 | −3.7007447E−03 |
| A8 | 1.7215196E−05 | 2.1628206E−03 | −3.7481668E−04 |
| A9 | −3.0246227E−06 | −8.4580184E−04 | 2.3416744E−03 |
| A10 | −1.4471824E−07 | −7.4333243E−05 | −2.3902386E−03 |
| A11 | 4.0978013E−08 | 9.3817075E−05 | 1.1400636E−03 |
| A12 | −1.2252258E−09 | −1.3417545E−05 | −2.3160584E−04 |

| | Surface Number | | |
|---|---|---|---|
| | 9 | 13 | 14 |
| KA | 1.0000000E+00 | 1.0000000E+00 | 1.0000000E+00 |
| A3 | −2.3959874E−17 | 0.0000000E+00 | −2.2166974E−17 |
| A4 | −6.3141649E−03 | −6.6549820E−03 | −2.1295448E−03 |
| A5 | 9.3254469E−04 | 6.7917107E−03 | 5.7746470E−03 |
| A6 | −3.5897989E−03 | −4.0881272E−03 | −9.1655077E−04 |
| A7 | 1.2613214E−03 | −1.0711240E−03 | −4.2006387E−03 |
| A8 | 3.3640751E−03 | 2.3034824E−03 | 3.2025322E−03 |
| A9 | −4.5547464E−03 | −7.3710300E−04 | −2.8048831E−04 |
| A10 | 1.9861913E−03 | −1.4715524E−04 | −5.3997964E−04 |
| A11 | −2.4642376E−04 | 1.2239790E−04 | 2.2325946E−04 |
| A12 | −3.3550140E−05 | −1.8401055E−05 | −2.7235253E−05 |

Figure 3:
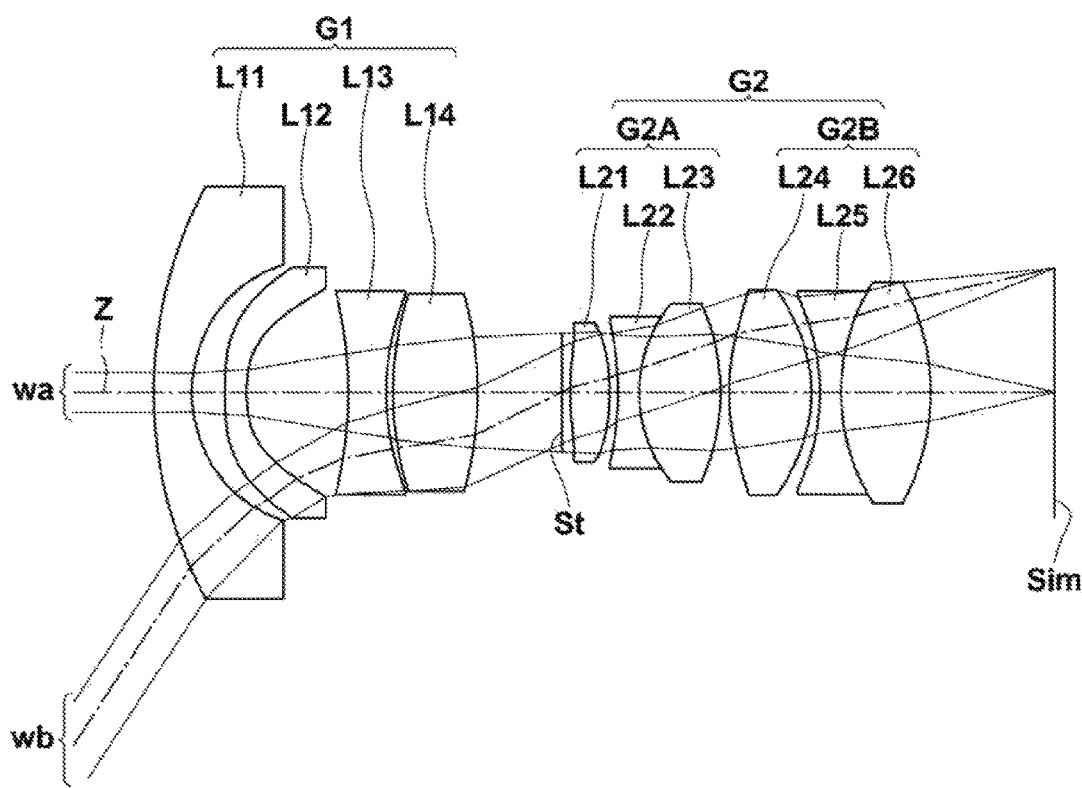
FIG. 3 is a cross sectional diagram that illustrates the lens configuration of an imaging lens according to Example 3 of the present disclosure.
Figure 12:
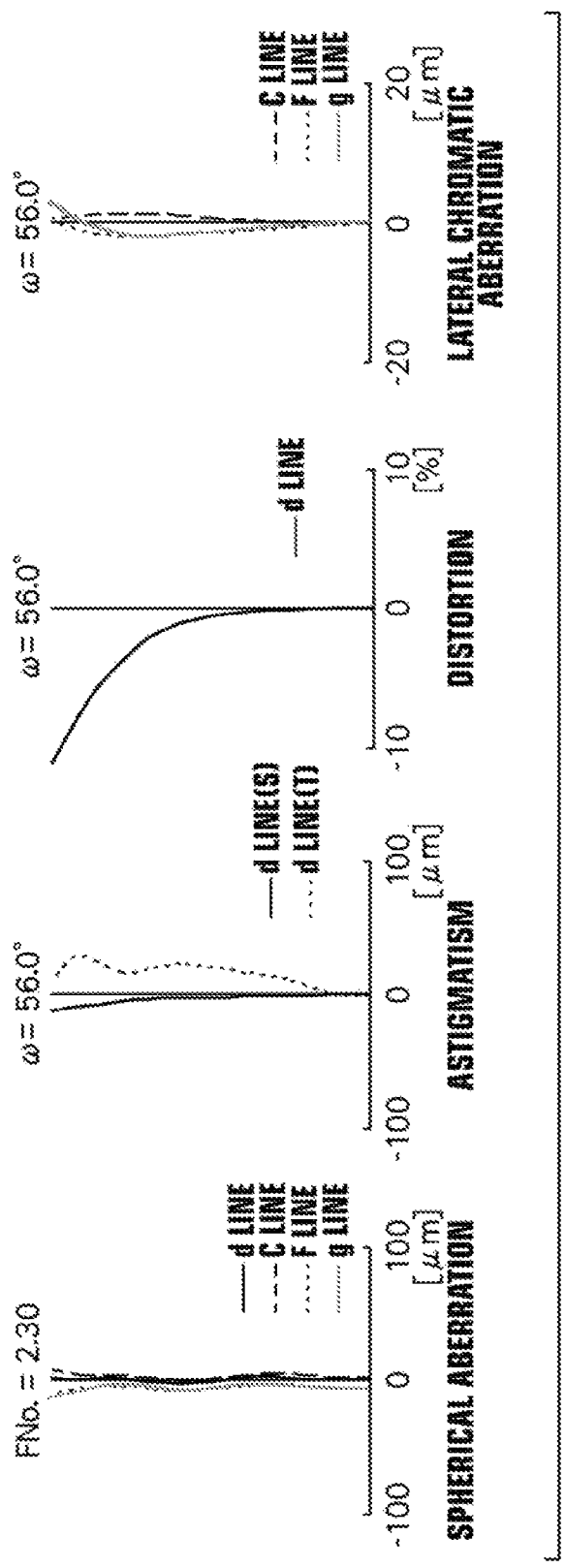
FIG. 12 is a collection of diagrams that illustrate aberrations of the imaging lens according to Example 3.
Figure 13:
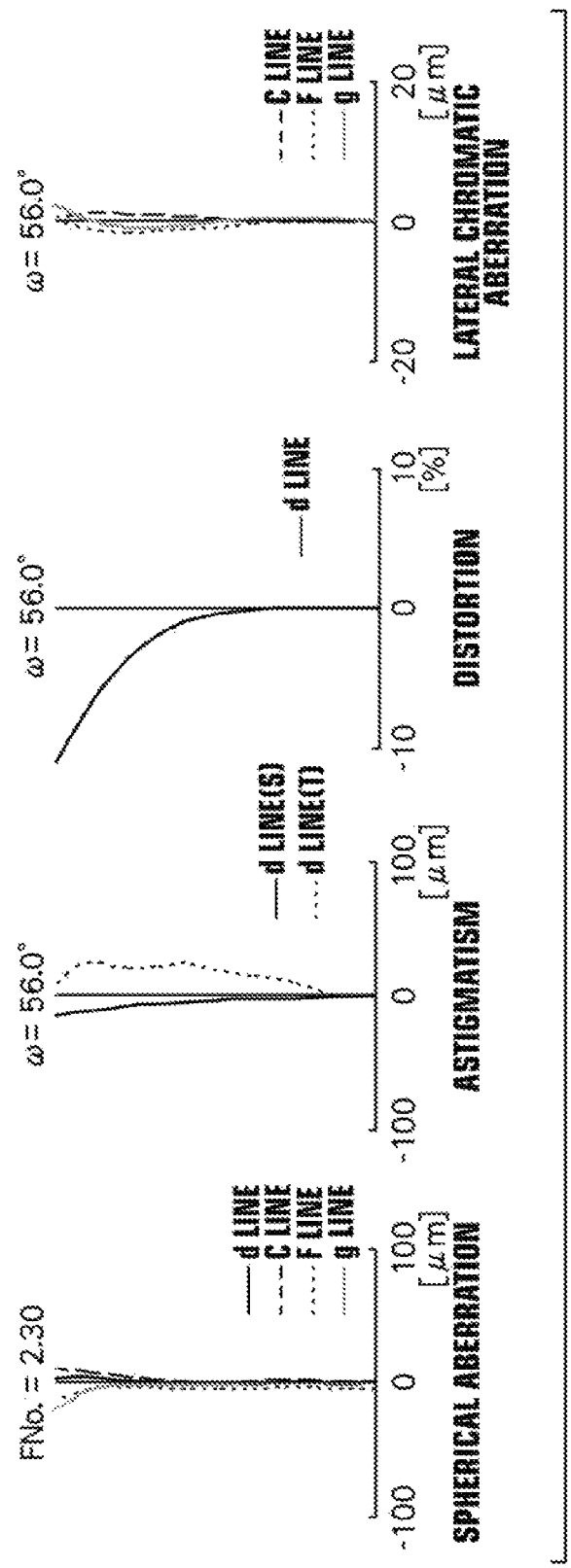
FIG. 13 is a collection of diagrams that illustrate aberrations of the imaging lens according to Example 4.

Next, an imaging lens of Example 3 will be described. FIG. 3 is a cross sectional diagram that illustrates the lens configuration of the imaging lens of Example 3. Basic lens data are shown in Table 7, data related to various items are shown in Table 8, and aspherical surface coefficients are shown in Table 9 for the imaging lens of Example 3. In addition, FIG. 12 is a collection of diagrams that illustrate various aberrations of the imaging lens of Example 3.

configuration of the imaging lens of Example 4. Basic lens data are shown in Table 10, data related to various items are shown in Table 11, and aspherical surface coefficients are shown in Table 12 for the imaging lens of Example 4. In addition, FIG. 13 is a collection of diagrams that illustrate various aberrations of the imaging lens of Example 4.

TABLE 7

Example 3: Lens Data

| Surface Number | Radius of Curvature | Distance | nd | νd | θgF |
|---|---|---|---|---|---|
| 1 | 10.84997 | 1.014 | 1.75500 | 52.32 | 0.54765 |
| 2 | 3.43528 | 0.908 | | | |
| *3 | 56.33892 | 0.563 | 1.53112 | 55.30 | 0.55145 |
| *4 | 4.03326 | 2.704 | | | |
| 5 | −10.61342 | 1.014 | 1.59282 | 68.62 | 0.54414 |
| 6 | 6.40959 | 0.180 | | | |
| 7 | 7.92207 | 2.254 | 1.88300 | 40.76 | 0.56679 |
| 8 | −9.13862 | 2.268 | | | |
| 9 (stop) | ∞ | 0.225 | | | |
| *10 | 7.81072 | 1.046 | 1.59201 | 67.02 | 0.53589 |
| *11 | −5.87844 | 0.225 | | | |
| 12 | −7.77341 | 0.563 | 1.80400 | 46.58 | 0.55730 |
| 13 | 3.52966 | 2.166 | 1.49700 | 81.54 | 0.53748 |
| 14 | −5.43673 | 0.225 | | | |
| *15 | 5.52320 | 2.212 | 1.49710 | 81.56 | 0.53848 |
| *16 | −3.69470 | 0.225 | | | |
| 17 | −5.48766 | 0.563 | 1.80400 | 46.58 | 0.55730 |
| 18 | 5.18911 | 2.383 | 1.49700 | 81.54 | 0.53748 |
| 19 | −5.80642 | 3.294 | | | |

TABLE 8

Example 3: Items

| | |
|---|---|
| f | 2.429 |
| Bf | 3.294 |
| FNo. | 2.30 |
| 2ω [°] | 112.0 |

TABLE 9

Example 3: Aspherical Surface Coefficients

| | Surface Number | | |
|---|---|---|---|
| | 3 | 4 | 10 |
| KA | 1.0000000E+00 | −5.1427089E+00 | 1.0000000E+00 |
| A3 | −1.5616021E−17 | 1.6757237E−03 | 0.0000000E+00 |
| A4 | 5.8218270E−02 | 6.5993745E−02 | −2.7378967E−03 |
| A5 | −1.6795855E−02 | −1.3107042E−03 | −8.2421224E−03 |
| A6 | −4.4620314E−03 | −1.4966086E−02 | 7.6416136E−03 |
| A7 | 2.7138794E−03 | 2.9823671E−03 | −3.4804569E−03 |
| A8 | 2.1286316E−04 | 2.7436081E−03 | −9.6284705E−04 |
| A9 | −2.6147784E−04 | −1.1667856E−03 | 2.0314291E−03 |
| A10 | 3.9493957E−06 | −7.8135836E−05 | −2.0976277E−03 |
| A11 | 1.4209536E−05 | 1.0043735E−04 | 1.2216191E−03 |
| A12 | −1.7821525E−06 | −1.3417545E−05 | −2.9946897E−04 |

| | Surface Number | | |
|---|---|---|---|
| | 11 | 15 | 16 |
| KA | 1.0000000E+00 | 1.0000000E+00 | 1.0000000E+00 |
| A3 | 4.8800626E−17 | 4.7321421E−18 | −4.7321421E−17 |
| A4 | −5.7264647E−03 | −3.4503020E−03 | 4.2042678E−03 |
| A5 | −1.6312704E−04 | 1.5410689E−03 | −1.5905808E−03 |
| A6 | −6.0027742E−03 | 6.8116826E−05 | 4.6891768E−03 |
| A7 | 4.6198796E−03 | −1.8641204E−03 | −5.1086500E−03 |
| A8 | 3.5371263E−03 | 1.4333424E−03 | 1.9350401E−03 |
| A9 | −6.4904756E−03 | −2.4307655E−04 | 3.6002940E−04 |
| A10 | 2.5242881E−03 | −1.5906911E−04 | −5.3611634E−04 |
| A11 | 3.6751063E−05 | 7.6879564E−05 | 1.6357494E−04 |
| A12 | −1.4938203E−04 | −9.8313359E−06 | −1.7067375E−05 |

Figure 4:
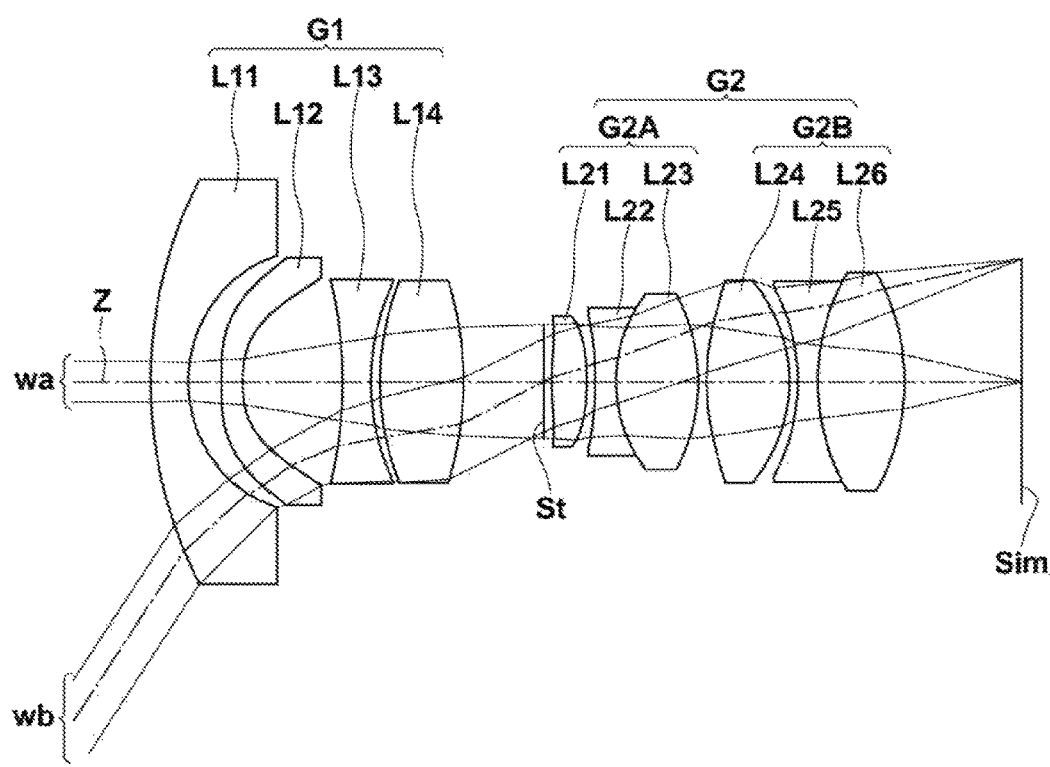
FIG. 4 is a cross sectional diagram that illustrates the lens configuration of an imaging lens according to Example 4 of the present disclosure.

Next, an imaging lens of Example 4 will be described. FIG. 4 is a cross sectional diagram that illustrates the lens

TABLE 10

Example 4: Lens Data

| Surface Number | Radius of Curvature | Distance | nd | νd | θgF |
|---|---|---|---|---|---|
| 1 | 11.28675 | 1.014 | 1.76195 | 39.75 | 0.57582 |
| 2 | 3.44528 | 0.918 | | | |
| *3 | 54.28958 | 0.572 | 1.53112 | 55.30 | 0.55145 |
| *4 | 3.96842 | 2.704 | | | |
| 5 | −11.17232 | 0.769 | 1.59282 | 68.62 | 0.54414 |
| 6 | 5.92758 | 0.249 | | | |
| 7 | 6.97163 | 2.254 | 1.88300 | 40.76 | 0.56679 |
| 8 | −8.67334 | 2.197 | | | |
| 9 (stop) | ∞ | 0.225 | | | |
| *10 | 9.92670 | 0.946 | 1.53112 | 55.30 | 0.55145 |
| *11 | −5.51831 | 0.225 | | | |
| 12 | −8.44517 | 0.563 | 1.80400 | 44.67 | 0.56077 |
| 13 | 3.67668 | 2.223 | 1.49700 | 81.54 | 0.53748 |
| 14 | −4.69168 | 0.225 | | | |
| *15 | 5.72821 | 2.245 | 1.49710 | 81.56 | 0.53848 |
| *16 | −3.59461 | 0.225 | | | |
| 17 | −4.99682 | 0.563 | 1.80401 | 39.38 | 0.57479 |
| 18 | 5.51616 | 2.342 | 1.49700 | 81.54 | 0.53748 |
| 19 | −5.70469 | 3.168 | | | |

TABLE 11

Example 4: Items

| | |
|---|---|
| f | 2.427 |
| Bf | 3.168 |
| FNo. | 2.30 |
| 2ω [°] | 112.0 |

TABLE 12

Example 4: Aspherical Surface Coefficients

| | Surface Number | | |
|---|---|---|---|
| | 3 | 4 | 10 |
| KA | 1.0000000E+00 | −4.6625881E+00 | 1.0000000E+00 |
| A3 | 0.0000000E+00 | 9.4599599E−04 | 2.8381630E−17 |
| A4 | 6.3467644E−02 | 7.2544919E−02 | −6.5255337E−03 |
| A5 | −2.0302048E−02 | −4.7679014E−03 | −6.7018768E−03 |
| A6 | −4.2245429E−03 | −1.5829280E−02 | 5.1131605E−03 |
| A7 | 3.2379128E−03 | 4.1591869E−03 | −3.3306746E−03 |
| A8 | 9.3237854E−05 | 2.6739984E−03 | 1.1372324E−04 |
| A9 | −2.9723950E−04 | −1.3091898E−03 | 1.2691234E−03 |
| A10 | 1.4526182E−05 | −6.7733436E−05 | −2.0661428E−03 |
| A11 | 1.5084924E−05 | 1.0583795E−04 | 1.3617306E−03 |
| A12 | −2.1126336E−06 | −1.3417545E−05 | −3.5929859E−04 |

| | Surface Number | | |
|---|---|---|---|
| | 11 | 15 | 16 |
| KA | 1.0000000E+00 | 1.0000000E+00 | 1.0000000E+00 |
| A3 | −4.9329153E−18 | 0.0000000E+00 | −1.8928568E−17 |
| A4 | −8.4876305E−03 | −3.3498690E−03 | 3.7995285E−03 |
| A5 | −6.0603967E−04 | 1.2689144E−03 | −1.7222049E−03 |
| A6 | −5.1252984E−03 | 2.8108365E−04 | 4.9645791E−03 |
| A7 | 3.7550491E−03 | −1.8787243E−03 | −5.2028907E−03 |
| A8 | 3.3136359E−03 | 1.3870363E−03 | 1.8964190E−03 |
| A9 | −6.3055258E−03 | −2.2999017E−04 | 3.8859329E−04 |
| A10 | 2.5966521E−03 | −1.5661979E−04 | −5.3692051E−04 |

TABLE 12-continued

Example 4: Aspherical Surface Coefficients

| | | | |
|---|---|---|---|
| A11 | 2.0990285E−05 | 7.5874038E−05 | 1.6158069E−04 |
| A12 | −1.6940103E−04 | −9.7189159E−06 | −1.6683110E−05 |

Figure 5:
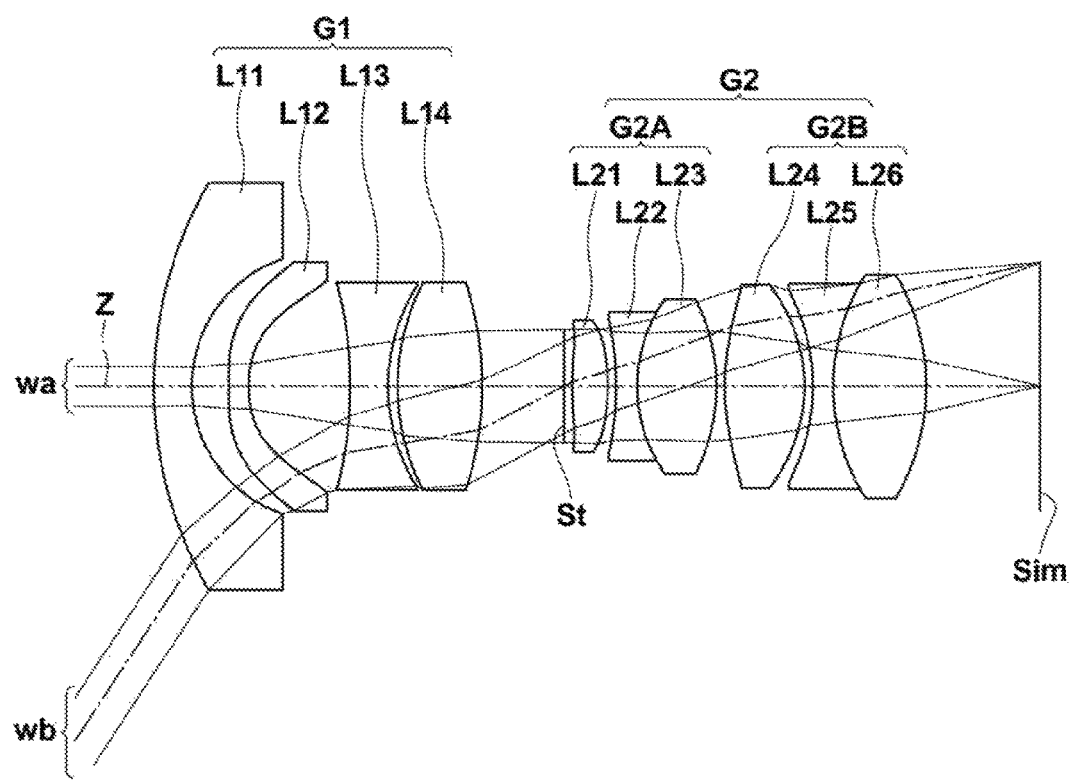
FIG. 5 is a cross sectional diagram that illustrates the lens configuration of an imaging lens according to Example 5 of the present disclosure.
Figure 14:
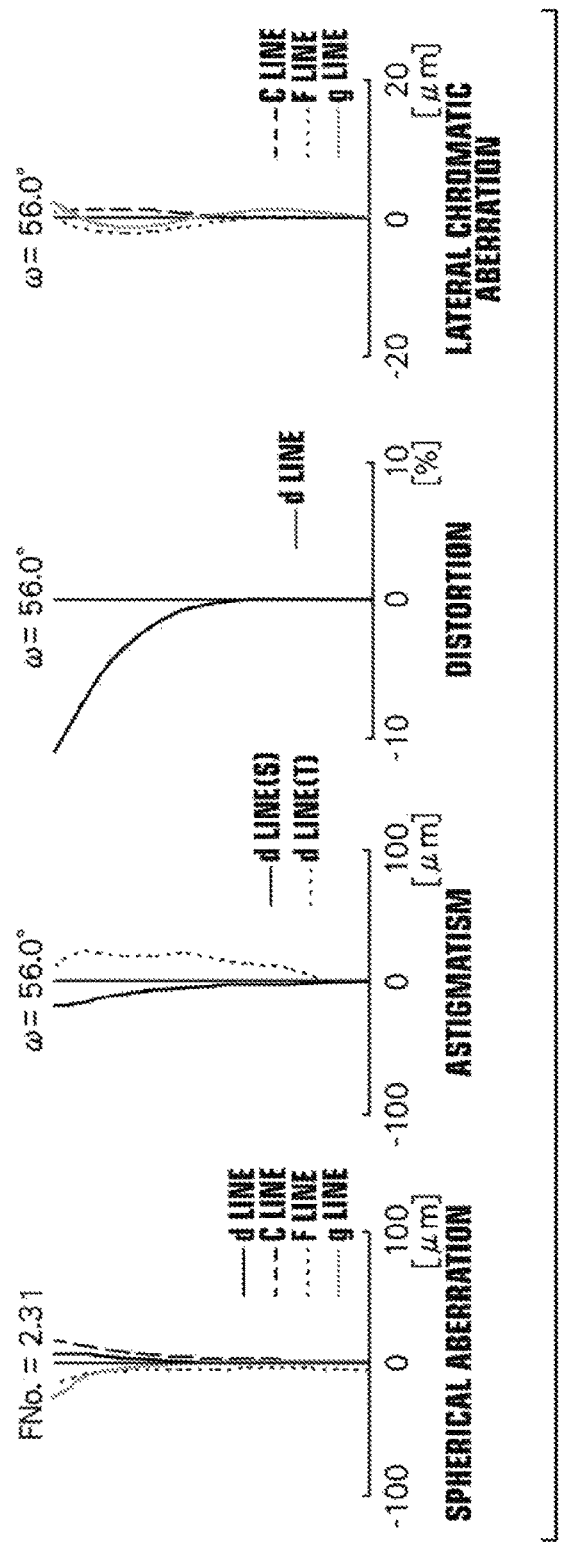
FIG. 14 is a collection of diagrams that illustrate aberrations of the imaging lens according to Example 5.

Next, an imaging lens of Example 5 will be described. FIG. 5 is a cross sectional diagram that illustrates the lens configuration of the imaging lens of Example 5. Basic lens data are shown in Table 13, data related to various items are shown in Table 14, and aspherical surface coefficients are shown in Table 15 for the imaging lens of Example 5. In addition, FIG. 14 is a collection of diagrams that illustrate various aberrations of the imaging lens of Example 5.

TABLE 13

Example 5: Lens Data

| Surface Number | Radius of Curvature | Distance | nd | vd | θgF |
|---|---|---|---|---|---|
| 1 | 10.15323 | 1.014 | 1.80001 | 28.31 | 0.60407 |
| 2 | 3.43523 | 0.984 | | | |
| *3 | 33.33758 | 0.563 | 1.53112 | 55.30 | 0.55145 |
| *4 | 4.03075 | 2.704 | | | |
| 5 | −10.08079 | 1.012 | 1.59282 | 68.62 | 0.54414 |
| 6 | 4.77602 | 0.257 | | | |
| 7 | 5.69967 | 2.254 | 1.88300 | 40.76 | 0.56679 |
| 8 | −8.49353 | 2.216 | | | |
| 9 (stop) | ∞ | 0.225 | | | |
| *10 | 9.32705 | 0.941 | 1.53112 | 55.30 | 0.55145 |
| *11 | −5.96577 | 0.225 | | | |
| 12 | −7.93135 | 0.563 | 1.80400 | 47.60 | 0.55302 |
| 13 | 3.81248 | 2.115 | 1.49700 | 81.54 | 0.53748 |
| 14 | −4.85895 | 0.225 | | | |
| *15 | 5.95836 | 2.130 | 1.53112 | 55.30 | 0.55145 |
| *16 | −3.89435 | 0.225 | | | |
| 17 | −5.09007 | 0.563 | 1.78882 | 27.90 | 0.60496 |
| 18 | 5.29265 | 2.482 | 1.49700 | 81.54 | 0.53748 |
| 19 | −5.55627 | 3.038 | | | |

TABLE 14

Example 5: Items

| | |
|---|---|
| f' | 2.428 |
| Bf' | 3.038 |
| FNo. | 2.31 |
| 2ω [°] | 112.0 |

TABLE 15

Example 5: Aspherical Surface Coefficients

| | Surface Number | | |
|---|---|---|---|
| | 3 | 4 | 10 |
| KA | 1.0000000E+00 | −4.4606953E+00 | 1.0000000E+00 |
| A3 | 7.8080107E−18 | 9.7622143E−04 | 7.0954074E−18 |
| A4 | 6.1940636E−02 | 6.9619613E−02 | −7.4144042E−03 |
| A5 | −2.0070214E−02 | −3.7673098E−03 | −5.6122497E−03 |
| A6 | −3.8324614E−03 | −1.6182447E−02 | 4.5716195E−03 |
| A7 | 3.1509070E−03 | 4.2348960E−03 | −4.4164717E−03 |
| A8 | 6.4109407E−05 | 2.8276992E−03 | 9.7965674E−04 |
| A9 | −2.8938967E−04 | −1.3731741E−03 | 1.6154119E−03 |
| A10 | 1.5148628E−05 | −7.8617965E−05 | −2.4301129E−03 |
| A11 | 1.4823242E−05 | 1.1068612E−04 | 1.3231600E−03 |
| A12 | −2.1236410E−06 | −1.3417545E−05 | −3.1025665E−04 |

TABLE 15-continued

Example 5: Aspherical Surface Coefficients

| | Surface Number | | |
|---|---|---|---|
| | 11 | 15 | 16 |
| KA | 1.0000000E+00 | 1.0000000E+00 | 1.0000000E+00 |
| A3 | −1.9203134E−17 | −9.4642841E−18 | −9.4642841E−18 |
| A4 | −1.0606182E−02 | −4.0630049E−03 | 2.6319975E−03 |
| A5 | 8.3378697E−04 | 1.7320433E−03 | −1.7413853E−03 |
| A6 | −5.3805992E−03 | 1.4498691E−04 | 5.2151849E−03 |
| A7 | 2.3440760E−03 | −2.0084169E−03 | −5.4019545E−03 |
| A8 | 4.1010516E−03 | 1.4558597E−03 | 1.8896071E−03 |
| A9 | −5.8910383E−03 | −2.2356807E−04 | 4.2665498E−04 |
| A10 | 2.2921142E−03 | −1.6502406E−04 | −5.4356291E−04 |
| A11 | −2.0132280E−05 | 7.6237195E−05 | 1.5929470E−04 |
| A12 | −1.3323307E−04 | −9.4441661E−06 | −1.6129617E−05 |

Figure 6:
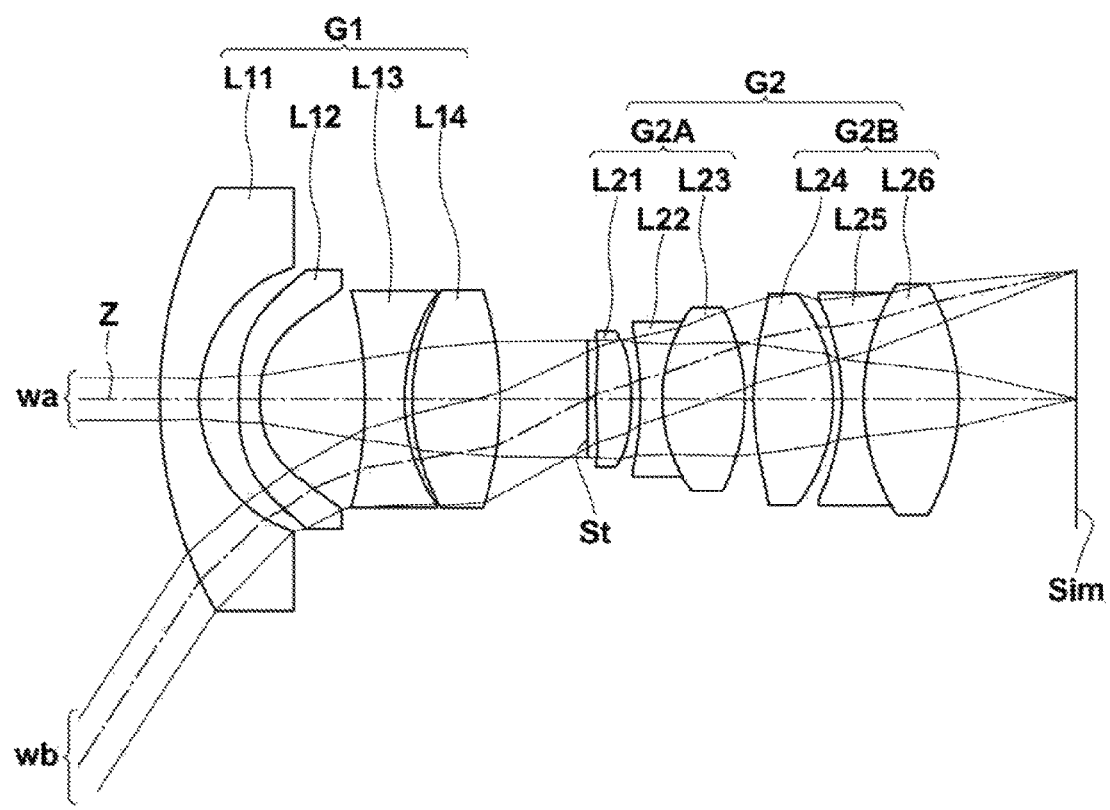
FIG. 6 is a cross sectional diagram that illustrates the lens configuration of an imaging lens according to Example 6 of the present disclosure.
Figure 15:
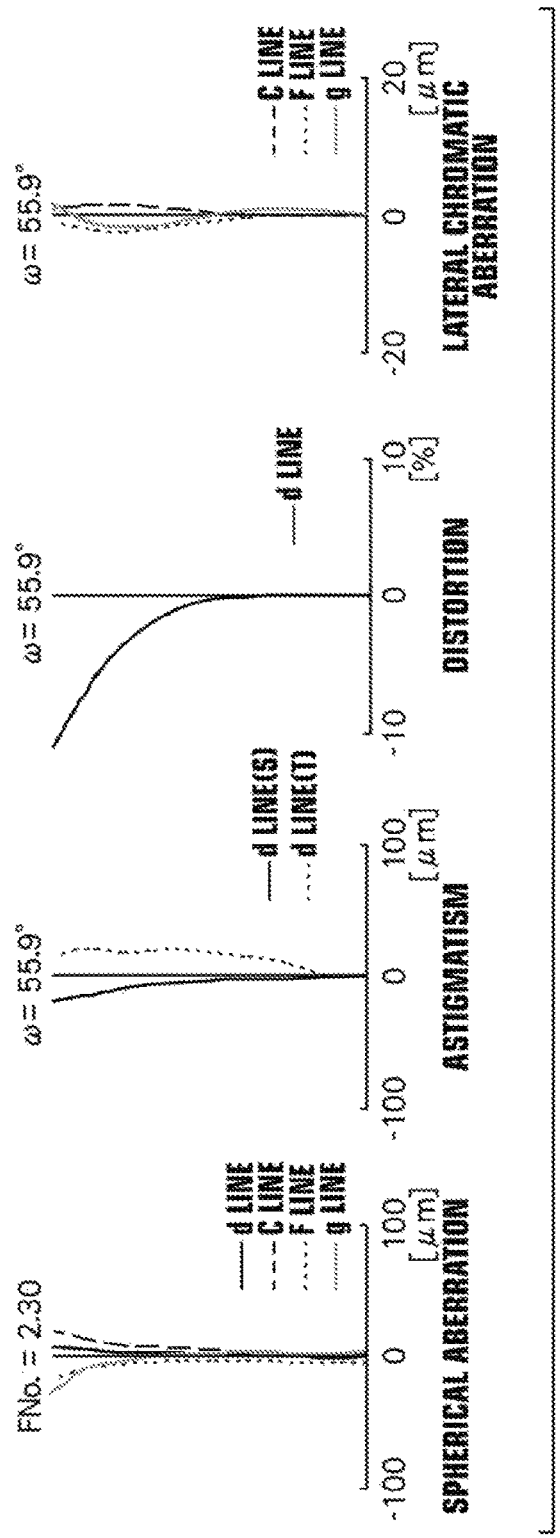
FIG. 15 is a collection of diagrams that illustrate aberrations of the imaging lens according to Example 6.

Next, an imaging lens of Example 6 will be described. FIG. 6 is a cross sectional diagram that illustrates the lens configuration of the imaging lens of Example 6. Basic lens data are shown in Table 16, data related to various items are shown in Table 17, and aspherical surface coefficients are shown in Table 18 for the imaging lens of Example 6. In addition, FIG. 15 is a collection of diagrams that illustrate various aberrations of the imaging lens of Example 6.

TABLE 16

Example 6: Lens Data

| Surface Number | Radius of Curvature | Distance | nd | vd | θgF |
|---|---|---|---|---|---|
| 1 | 10.31915 | 1.014 | 1.80000 | 29.84 | 0.60178 |
| 2 | 3.43524 | 1.021 | | | |
| *3 | 25.24978 | 0.563 | 1.53112 | 55.30 | 0.55145 |
| *4 | 3.82209 | 2.704 | | | |
| 5 | −10.25368 | 1.012 | 1.59282 | 68.62 | 0.54414 |
| 6 | 4.58845 | 0.210 | | | |
| 7 | 5.36646 | 2.254 | 1.88300 | 40.76 | 0.56679 |
| 8 | −8.53492 | 2.270 | | | |
| 9 (stop) | ∞ | 0.225 | | | |
| *10 | 10.97865 | 0.916 | 1.53112 | 55.30 | 0.55145 |
| *11 | −5.47894 | 0.225 | | | |
| 12 | −8.03099 | 0.563 | 1.78590 | 44.20 | 0.56317 |
| 13 | 3.84304 | 2.126 | 1.49700 | 81.54 | 0.53748 |
| 14 | −4.84976 | 0.225 | | | |
| *15 | 6.43949 | 2.065 | 1.53112 | 55.30 | 0.55145 |
| *16 | −3.92986 | 0.225 | | | |
| 17 | −5.32161 | 0.563 | 1.80000 | 29.84 | 0.60178 |
| 18 | 5.28788 | 2.451 | 1.49700 | 81.54 | 0.53748 |
| 19 | −5.60671 | 3.023 | | | |

TABLE 17

Example 6: Items

| | |
|---|---|
| f' | 2.430 |
| Bf' | 3.023 |
| FNo. | 2.30 |
| 2ω [°] | 111.8 |

TABLE 18

Example 6: Aspherical Surface Coefficients

| | Surface Number | | |
|---|---|---|---|
| | 3 | 4 | 10 |
| KA | 1.0000000E+00 | −4.3860663E+00 | 1.0000000E+00 |
| A3 | −7.0382068E−18 | 1.2512899E−03 | −3.5177231E−17 |

TABLE 18-continued

Example 6: Aspherical Surface Coefficients

| | | | |
|---|---|---|---|
| A4  |  6.1765716E-02 |  7.0338531E-02 | -8.3851595E-03 |
| A5  | -2.0476378E-02 | -3.0487073E-03 | -5.0920775E-03 |
| A6  | -3.6519374E-03 | -1.7029685E-02 |  4.3764741E-03 |
| A7  |  3.1888905E-03 |  4.3068658E-03 | -5.0265478E-03 |
| A8  |  3.2819210E-05 |  2.9871340E-03 |  1.2901144E-03 |
| A9  | -2.9161972E-04 | -1.4216292E-03 |  1.7460366E-03 |
| A10 |  1.7530083E-05 | -8.7630654E-05 | -2.5098175E-03 |
| A11 |  1.4865165E-05 |  1.1415871E-04 |  1.3113798E-03 |
| A12 | -2.2030589E-06 | -1.3417545E-05 | -3.1087869E-04 |

| | Surface Number | | |
|---|---|---|---|
| | 11 | 15 | 16 |
| KA  |  1.0000000E+00 |  1.0000000E+00 |  1.0000000E+00 |
| A3  | -2.7632266E-17 |  0.0000000E+00 |  1.7062371E-17 |
| A4  | -1.0809975E-02 | -4.1927970E-03 |  2.3965961E-03 |
| A5  |  1.5256061E-03 |  1.5708422E-03 | -2.0383009E-03 |
| A6  | -5.2126009E-03 |  2.5589142E-04 |  5.3798824E-03 |
| A7  |  1.3276128E-03 | -1.9833597E-03 | -5.3673251E-03 |
| A8  |  4.3651101E-03 |  1.4164491E-03 |  1.8444177E-03 |
| A9  | -5.5600472E-03 | -2.2630085E-04 |  4.2530995E-04 |
| A10 |  2.1673942E-03 | -1.5924379E-04 | -5.3836422E-04 |
| A11 | -5.7076089E-05 |  7.6343519E-05 |  1.5923857E-04 |
| A12 | -1.2088863E-04 | -9.7691800E-06 | -1.6377765E-05 |

Figure 7:
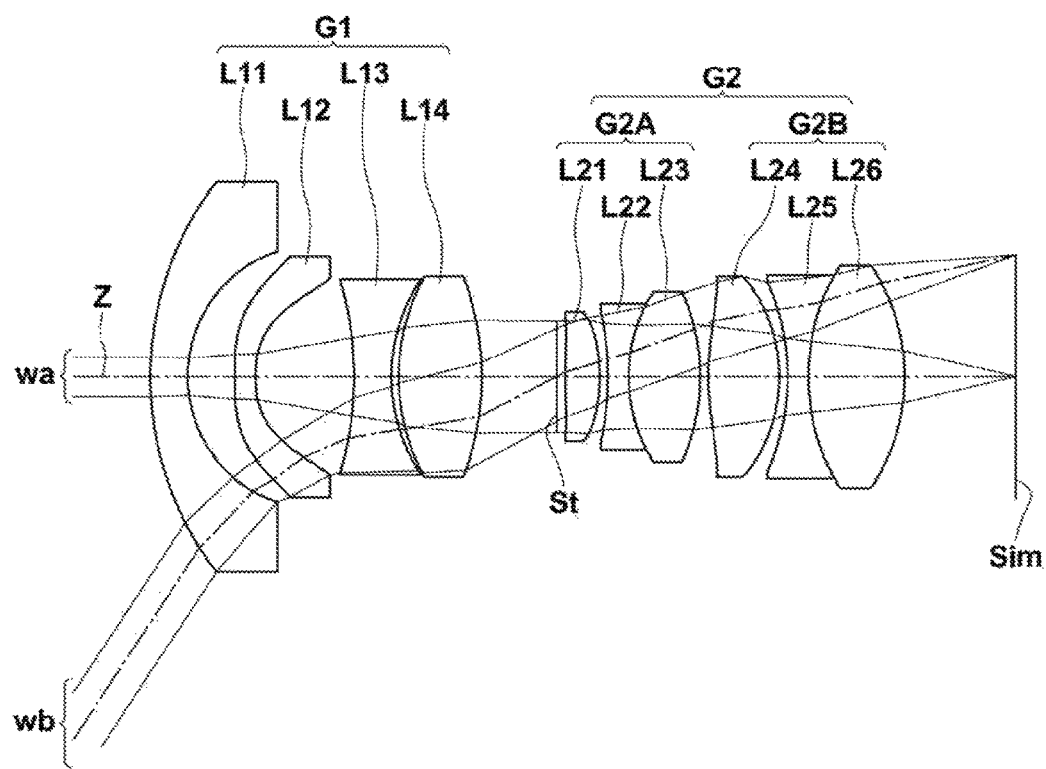
FIG. 7 is a cross sectional diagram that illustrates the lens configuration of an imaging lens according to Example 7 of the present disclosure.
Figure 16:
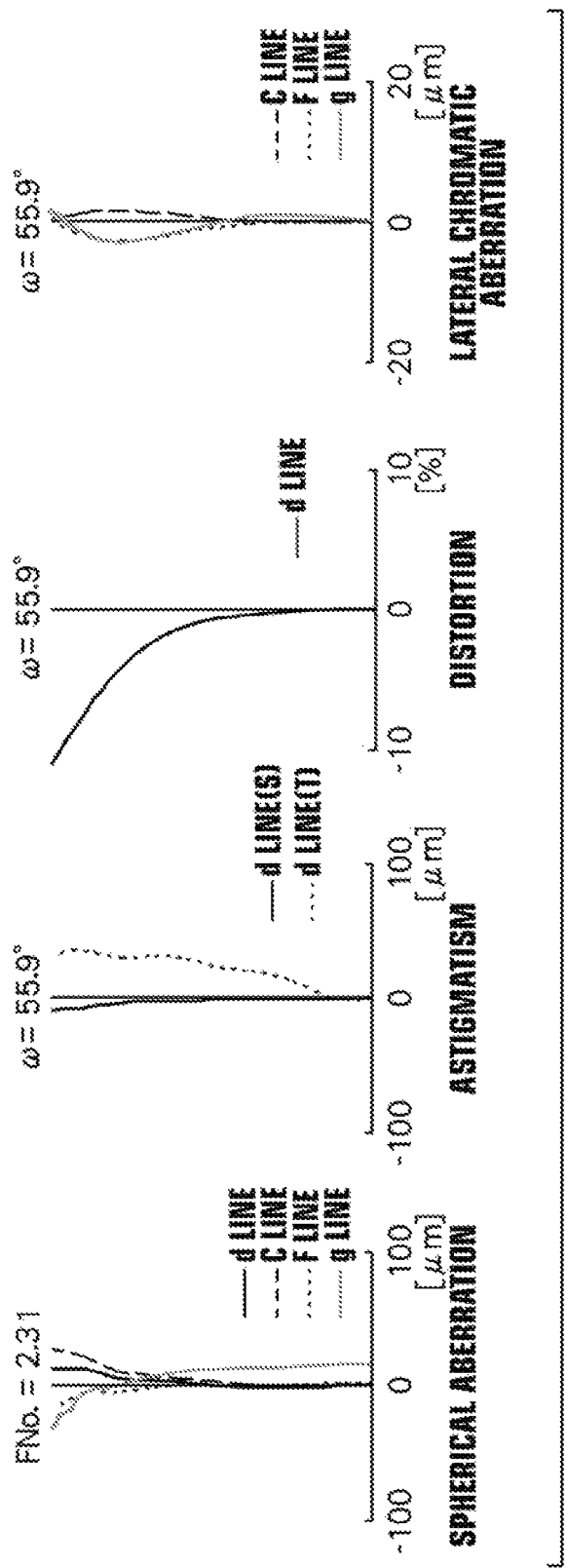
FIG. 16 is a collection of diagrams that illustrate aberrations of the imaging lens according to Example 7.

Next, an imaging lens of Example 7 will be described. FIG. 7 is a cross sectional diagram that illustrates the lens configuration of the imaging lens of Example 7. Basic lens data are shown in Table 19, data related to various items are shown in Table 20, and aspherical surface coefficients are shown in Table 21 for the imaging lens of Example 7. In addition, FIG. 16 is a collection of diagrams that illustrate various aberrations of the imaging lens of Example 7.

TABLE 19

Example 7: Lens Data

| Surface Number | Radius of Curvature | Distance | nd | vd | θgF |
|---|---|---|---|---|---|
| 1 | 8.22774 | 1.014 | 1.85896 | 22.73 | 0.62844 |
| 2 | 3.43523 | 1.299 | | | |
| *3 | 56.33933 | 0.563 | 1.53112 | 55.30 | 0.55145 |
| *4 | 3.68222 | 2.681 | | | |
| 5 | -8.65462 | 1.014 | 1.59282 | 68.62 | 0.54414 |
| 6 | 4.53857 | 0.198 | | | |
| 7 | 5.34112 | 2.253 | 1.88300 | 40.76 | 0.56679 |
| 8 | -7.29460 | 2.065 | | | |
| 9 (stop) | ∞ | 0.225 | | | |
| *10 | 11.65462 | 0.944 | 1.53112 | 55.30 | 0.55145 |
| *11 | -5.03343 | 0.225 | | | |
| 12 | -7.69182 | 0.563 | 1.80400 | 46.58 | 0.55730 |
| 13 | 4.08659 | 1.942 | 1.49700 | 81.54 | 0.53748 |
| 14 | -5.33616 | 0.225 | | | |
| *15 | 7.24245 | 1.930 | 1.53112 | 55.30 | 0.55145 |
| *16 | -3.95944 | 0.225 | | | |
| 17 | -5.93963 | 0.563 | 1.80518 | 25.42 | 0.61616 |
| 18 | 5.27620 | 2.631 | 1.49700 | 81.54 | 0.53748 |
| 19 | -5.17653 | 3.020 | | | |

TABLE 20

Example 7: Items

| | |
|---|---|
| f | 2.436 |
| Bf | 3.020 |
| FNo. | 2.31 |
| 2ω [°] | 111.8 |

TABLE 21

Example 7: Aspherical Surface Coefficients

| | Surface Number | | |
|---|---|---|---|
| | 3 | 4 | 10 |
| KA  |  1.0000000E+00 | -5.1426999E+00 |  1.0000000E+00 |
| A3  |  1.4076414E-17 |  1.7898935E-03 |  6.3958602E-18 |
| A4  |  6.8384507E-02 |  7.9231683E-02 | -8.2343640E-03 |
| A5  | -2.4756423E-02 |  2.8191193E-04 | -4.2078871E-03 |
| A6  | -3.8784148E-03 | -2.3739399E-02 |  2.6042175E-03 |
| A7  |  3.9267631E-03 |  5.7572350E-03 | -4.8755531E-03 |
| A8  | -6.0952071E-05 |  4.2939468E-03 |  2.5007783E-03 |
| A9  | -3.4957650E-04 | -1.8832211E-03 |  1.5703911E-03 |
| A10 |  2.9048234E-05 | -1.6475827E-04 | -2.8839115E-03 |
| A11 |  1.6524702E-05 |  1.4435406E-04 |  1.3431348E-03 |
| A12 | -2.6071062E-06 | -1.3417545E-05 | -2.6297060E-04 |

| | Surface Number | | |
|---|---|---|---|
| | 11 | 15 | 16 |
| KA  |  1.0000000E+00 |  1.0000000E+00 |  1.0000000E+00 |
| A3  |  3.8748695E-17 |  0.0000000E+00 |  8.5311857E-18 |
| A4  | -1.0535719E-02 | -5.0209177E-03 |  2.3305948E-03 |
| A5  |  4.8814594E-04 |  3.7504038E-04 | -2.9368184E-03 |
| A6  | -4.3441051E-03 |  1.0393155E-03 |  5.5596199E-03 |
| A7  |  1.1291648E-03 | -1.9725110E-03 | -5.0791019E-03 |
| A8  |  4.3972373E-03 |  1.2339111E-03 |  1.7373426E-03 |
| A9  | -5.3191929E-03 | -1.9846840E-04 |  3.7868812E-04 |
| A10 |  2.0109729E-03 | -1.4303224E-04 | -5.1821108E-04 |
| A11 | -9.1331624E-05 |  7.3743649E-05 |  1.6175624E-04 |
| A12 | -9.2125259E-05 | -1.0321926E-05 | -1.7709856E-05 |

Figure 8:
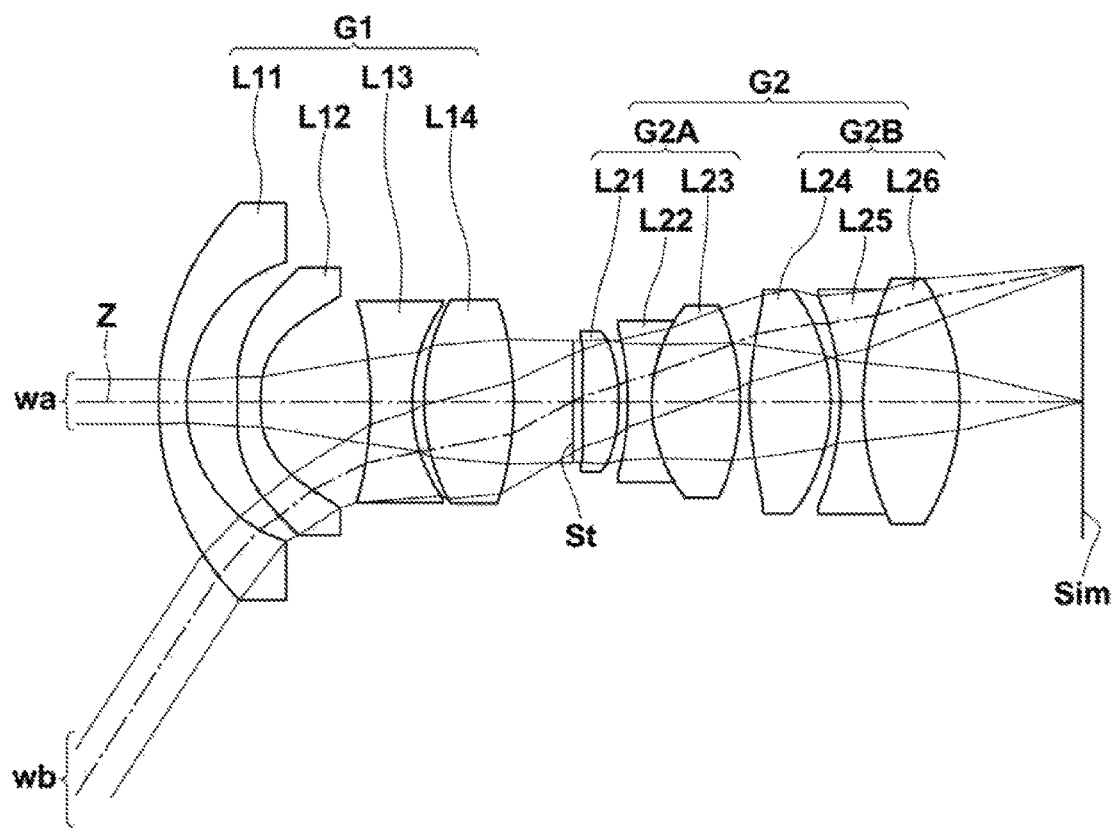
FIG. 8 is a cross sectional diagram that illustrates the lens configuration of an imaging lens according to Example 8 of the present disclosure.
Figure 17:
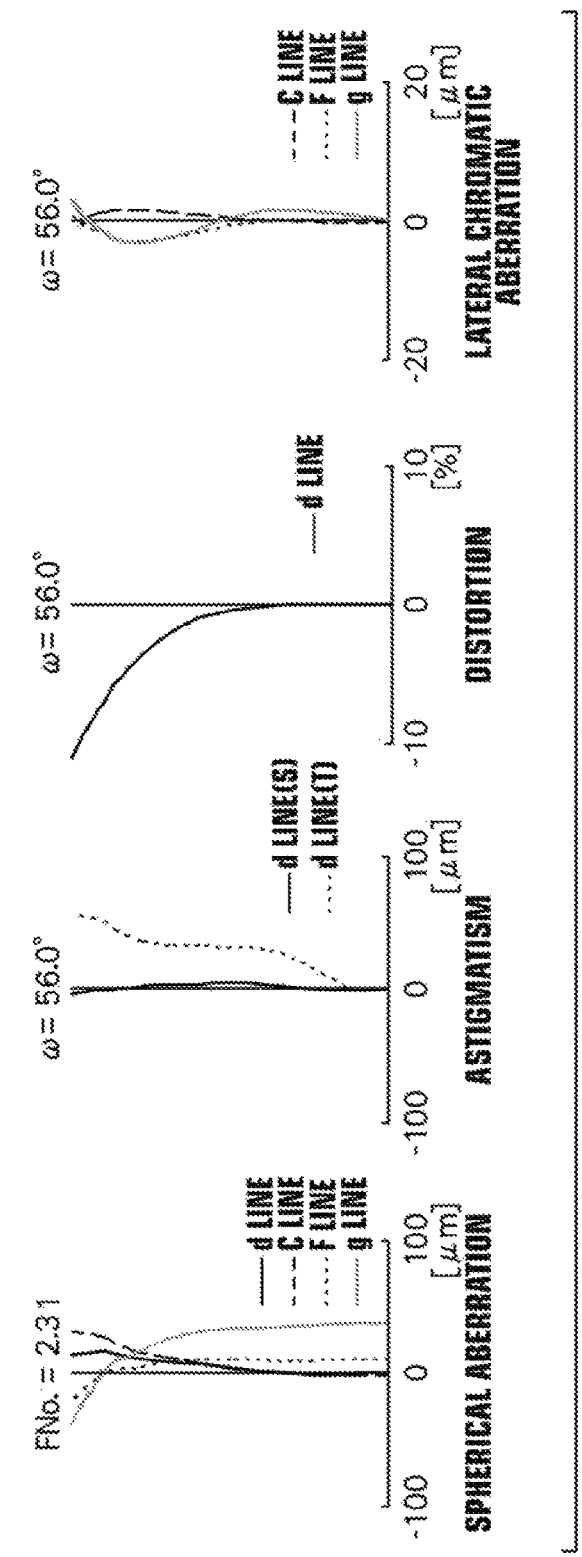
FIG. 17 is a collection of diagrams that illustrate aberrations of the imaging lens according to Example 8.

Next, an imaging lens of Example 8 will be described. FIG. 8 is a cross sectional diagram that illustrates the lens configuration of the imaging lens of Example 8. Basic lens data are shown in Table 22, data related to various items are shown in Table 23, and aspherical surface coefficients are shown in Table 24 for the imaging lens of Example 8. In addition, FIG. 17 is a collection of diagrams that illustrate various aberrations of the imaging lens of Example 8.

TABLE 22

Example 8: Lens Data

| Surface Number | Radius of Curvature | Distance | nd | vd | θgF |
|---|---|---|---|---|---|
| 1 | 6.55872 | 0.676 | 1.95906 | 17.47 | 0.65993 |
| 2 | 3.43525 | 1.258 | | | |
| *3 | 56.34361 | 0.563 | 1.53112 | 55.30 | 0.55145 |
| *4 | 3.68220 | 2.697 | | | |
| 5 | -8.38112 | 1.014 | 1.59282 | 68.62 | 0.54414 |
| 6 | 3.88057 | 0.291 | | | |
| 7 | 4.75732 | 2.187 | 1.88300 | 40.76 | 0.56679 |
| 8 | -7.43526 | 1.466 | | | |
| 9 (stop) | ∞ | 0.225 | | | |
| *10 | 16.05518 | 0.901 | 1.53112 | 55.30 | 0.55145 |
| *11 | -4.71312 | 0.225 | | | |
| 12 | -6.10781 | 0.580 | 1.72916 | 54.68 | 0.54451 |
| 13 | 3.56924 | 2.157 | 1.49700 | 81.54 | 0.53748 |
| 14 | -5.10920 | 0.225 | | | |
| *15 | 6.34282 | 2.007 | 1.53112 | 55.30 | 0.55145 |
| *16 | -3.91665 | 0.225 | | | |
| 17 | -6.02267 | 0.563 | 1.89286 | 20.36 | 0.63944 |
| 18 | 6.43128 | 2.359 | 1.49700 | 81.54 | 0.53748 |
| 19 | -5.17001 | 3.005 | | | |

TABLE 23

Example 8: Items

| | |
|---|---|
| f | 2.425 |
| Bf | 3.005 |
| FNo. | 2.31 |
| 2ω [°] | 112.0 |

TABLE 24

Example 8: Aspherical Surface Coefficients

| | Surface Number | | |
|---|---|---|---|
| | 3 | 4 | 10 |
| KA | 1.0000000E+00 | −5.1426957E+00 | 1.0000000E+00 |
| A3 | 0.0000000E+00 | 1.8679010E−03 | 3.1979301E−17 |
| A4 | 6.8622883E−02 | 7.9256994E−02 | −7.7359788E−03 |
| A5 | −2.5046668E−02 | 1.4390872E−03 | −6.8594487E−03 |
| A6 | −3.9967733E−03 | −2.4325185E−02 | 2.7929455E−03 |
| A7 | 4.0062857E−03 | 5.4112362E−03 | −3.6218995E−03 |
| A8 | −5.3850326E−05 | 4.4424823E−03 | 2.3109076E−03 |
| A9 | −3.5599887E−04 | −1.7945312E−03 | 1.1385312E−03 |
| A10 | 3.0179130E−05 | −1.7467051E−04 | −2.8170239E−04 |
| A11 | 1.6710953E−05 | 1.3664239E−04 | 1.3900346E−03 |
| A12 | −2.6889001E−06 | −1.3417545E−05 | −2.8346564E−04 |

| | Surface Number | | |
|---|---|---|---|
| | 11 | 15 | 16 |
| KA | 1.0000000E+00 | 1.0000000E+00 | 1.0000000E+00 |
| A3 | −3.3666899E−17 | 4.2655928E−18 | 8.5311857E−18 |
| A4 | −9.6445245E−03 | −4.6116698E−03 | 3.6555112E−03 |
| A5 | −2.7623004E−03 | 2.2007678E−04 | −3.5715180E−03 |
| A6 | −3.2622984E−03 | 1.0562675E−03 | 5.4521856E−03 |
| A7 | 2.5480347E−03 | −1.8206695E−03 | −4.7621299E−03 |
| A8 | 3.6519960E−03 | 1.1842120E−03 | 1.6920898E−03 |
| A9 | −5.6724128E−03 | −2.2481451E−04 | 3.3052739E−04 |
| A10 | 2.2116376E−03 | −1.3035129E−04 | −5.0542219E−04 |
| A11 | −6.1312055E−05 | 7.5241995E−05 | 1.6432460E−04 |
| A12 | −1.1695468E−04 | −1.1227970E−05 | −1.8554583E−05 |

Figure 9:
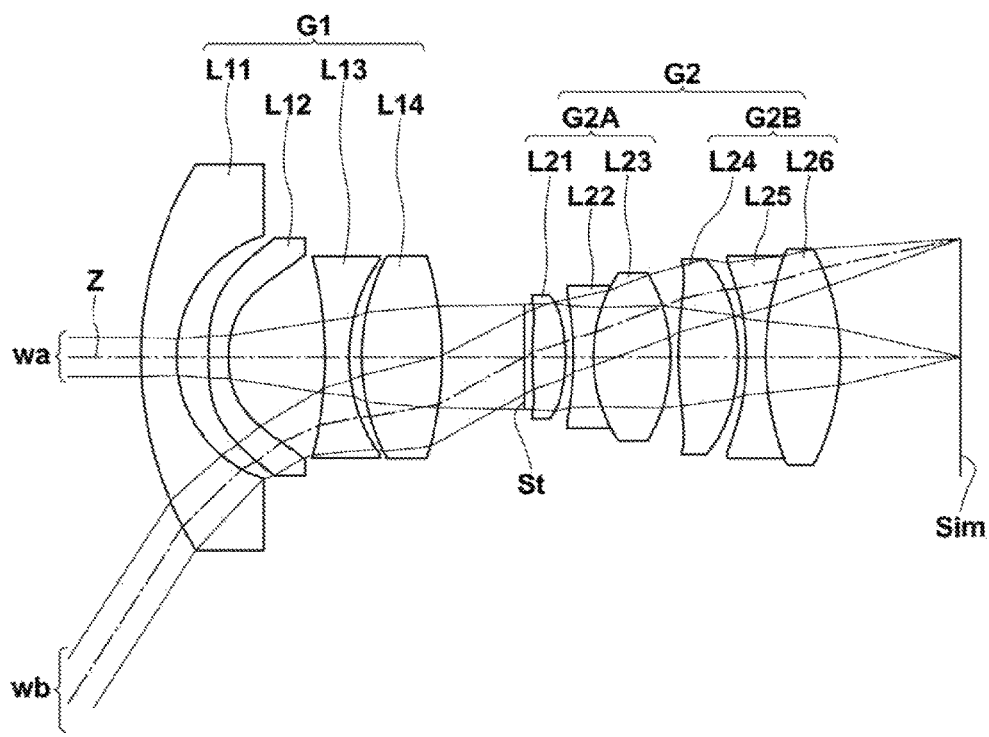
FIG. 9 is a cross sectional diagram that illustrates the lens configuration of an imaging lens according to Example 9 of the present disclosure.
Figure 18:
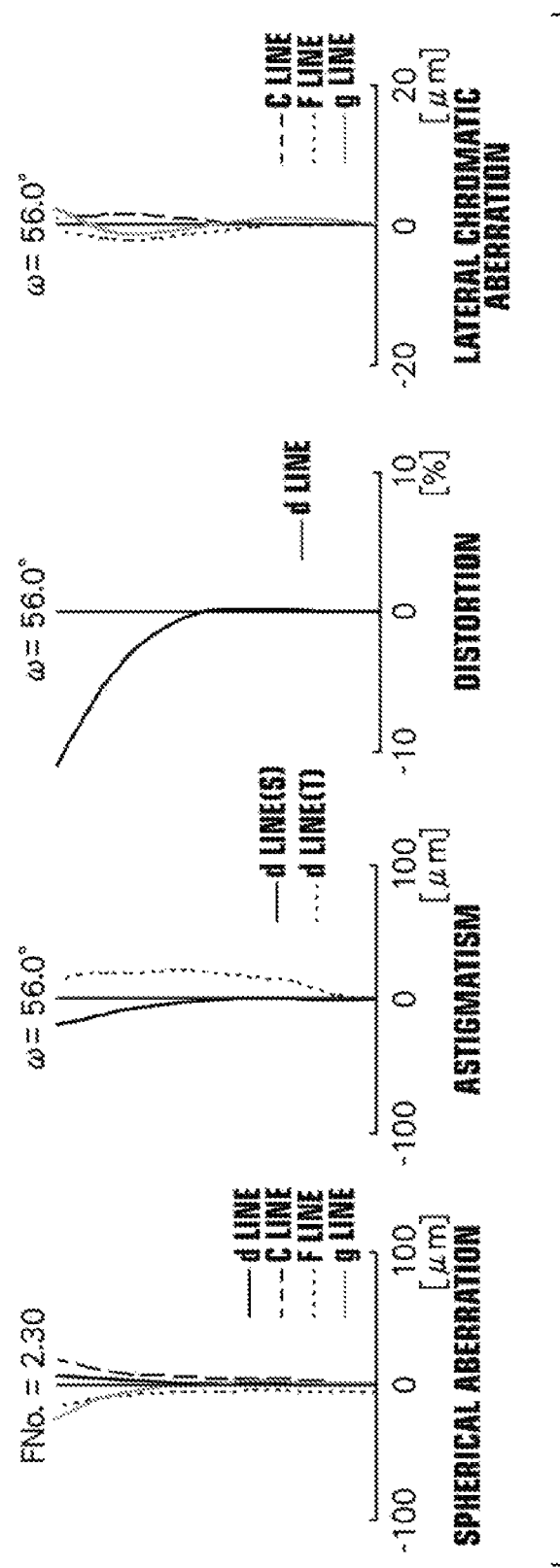
FIG. 18 is a collection of diagrams that illustrate aberrations of the imaging lens according to Example 9.

Next, an imaging lens of Example 9 will be described. FIG. 9 is a cross sectional diagram that illustrates the lens configuration of the imaging lens of Example 9. Basic lens data are shown in Table 25, data related to various items are shown in Table 26, and aspherical surface coefficients are shown in Table 27 for the imaging lens of Example 9. In addition, FIG. 18 is a collection of diagrams that illustrate various aberrations of the imaging lens of Example 9.

TABLE 25

Example 9: Lens Data

| Surface Number | Radius of Curvature | Distance | nd | vd | θgF |
|---|---|---|---|---|---|
| 1 | 9.58990 | 1.014 | 1.80000 | 29.84 | 0.60178 |
| 2 | 3.43523 | 0.901 | | | |
| *3 | 22.13665 | 0.563 | 1.53112 | 55.30 | 0.55145 |
| *4 | 3.92328 | 2.697 | | | |
| 5 | −10.55760 | 0.676 | 1.59282 | 68.62 | 0.54414 |
| 6 | 4.47980 | 0.354 | | | |
| 7 | 5.65265 | 2.254 | 1.88300 | 40.76 | 0.56679 |
| 8 | −8.84809 | 2.335 | | | |
| 9 (stop) | ∞ | 0.225 | | | |
| *10 | 12.32374 | 0.923 | 1.53112 | 55.30 | 0.55145 |
| *11 | −4.82235 | 0.225 | | | |
| 12 | −8.60787 | 0.563 | 1.80400 | 46.58 | 0.55730 |
| 13 | 4.06367 | 2.159 | 1.49700 | 81.54 | 0.53748 |
| 14 | −4.33714 | 0.225 | | | |
| *15 | 9.33876 | 1.679 | 1.53112 | 55.30 | 0.55145 |
| *16 | −4.80008 | 0.225 | | | |
| 17 | −6.28050 | 0.563 | 1.78470 | 26.29 | 0.61360 |
| 18 | 7.54633 | 2.087 | 1.49700 | 81.54 | 0.53748 |
| 19 | −6.00170 | 3.369 | | | |

TABLE 26

Example 9: Items

| | |
|---|---|
| f | 2.421 |
| Bf | 3.369 |
| FNo. | 2.30 |
| 2ω [°] | 112.0 |

TABLE 27

Example 9: Aspherical Surface Coefficients

| | Surface Number | | |
|---|---|---|---|
| | 3 | 4 | 10 |
| KA | 1.0000000E+00 | −4.8400882E+00 | 1.0000000E+00 |
| A3 | 7.8080107E−18 | 1.4355447E−03 | 1.7738518E−17 |
| A4 | 6.2084950E−02 | 7.0875828E−02 | −7.1008779E−03 |
| A5 | −2.0852102E−02 | −3.3098450E−03 | −1.0008876E−02 |
| A6 | −3.4872424E−03 | −1.7685507E−02 | 8.4161945E−03 |
| A7 | 3.2684858E−03 | 4.7581531E−03 | −4.1902447E−03 |
| A8 | 1.3933303E−05 | 3.1368468E−03 | −1.3764299E−03 |
| A9 | −2.9704765E−04 | −1.5125208E−03 | 1.8155220E−03 |
| A10 | 1.8415046E−05 | −9.6980978E−05 | −1.7262444E−03 |
| A11 | 1.4988031E−05 | 1.1927349E−04 | 1.2662061E−03 |
| A12 | −2.2280805E−06 | −1.3417545E−05 | −4.2174287E−04 |

| | Surface Number | | |
|---|---|---|---|
| | 11 | 15 | 16 |
| KA | 1.0000000E+00 | 1.0000000E+00 | 1.0000000E+00 |
| A3 | 7.0470218E−18 | −4.7321421E−18 | 1.8928568E−17 |
| A4 | −7.8087995E−03 | −4.5983881E−03 | 4.9204708E−04 |
| A5 | −1.5389961E−03 | 1.0858647E−03 | −3.1187477E−03 |
| A6 | −5.1003425E−03 | 5.0603493E−04 | 6.0074345E−03 |
| A7 | 4.3172143E−03 | −2.1749280E−03 | −5.5116607E−03 |
| A8 | 2.7710593E−03 | 1.3955184E−03 | 1.7483359E−03 |
| A9 | −6.6192668E−03 | −1.8376374E−04 | 4.6890997E−04 |
| A10 | 2.9163806E−03 | −1.6798470E−04 | −5.3821675E−04 |
| A11 | 5.5102849E−05 | 7.3550751E−05 | 1.5614444E−04 |
| A12 | −2.2836050E−04 | −8.8871992E−06 | −1.6020649E−05 |

Table 28 shows values related to Conditional Formulae (1) through (4) for the imaging lenses of Examples 1 through 9. Note that all of the Examples employ the d line as a reference wavelength, and the values shown in Table 28 below are those for the reference wavelength.

TABLE 28

| Formula | Condition | Example 1 | Example 2 | Example 3 | Example 4 | Example 5 |
|---|---|---|---|---|---|---|
| (1) | f2B/f2A | 0.958 | 0.795 | 1.258 | 1.179 | 1.423 |
| (2) | β2B | 0.451 | 0.567 | 0.395 | 0.450 | 0.433 |
| (3) | f2/f1 | −0.697 | −0.313 | −0.502 | −0.294 | −0.127 |
| (4) | (L24f + L23r)/(L24f − L23r) | 0.027 | 0.150 | 0.008 | 0.099 | 0.102 |

| Formula | Condition | Example 6 | Example 7 | Example 8 | Example 9 |
|---|---|---|---|---|---|
| (1) | f2B/f2A | 1.239 | 1.517 | 1.592 | 0.862 |
| (2) | β2B | 0.478 | 0.472 | 0.465 | 0.577 |
| (3) | f2/f1 | −0.118 | 0.058 | 0.154 | −0.186 |
| (4) | (L24f + L23r)/(L24f − L23r) | 0.141 | 0.152 | 0.108 | 0.366 |

From the data above, it can be understood that all of the imaging lenses of Examples 1 through 9 satisfy Conditional Formulae (1) through (4), have wide full angles of view 2ω of 100° or greater, have small F numbers of 2.5 or less, and are imaging lenses in which various aberrations are favorably corrected.

Figure 19:
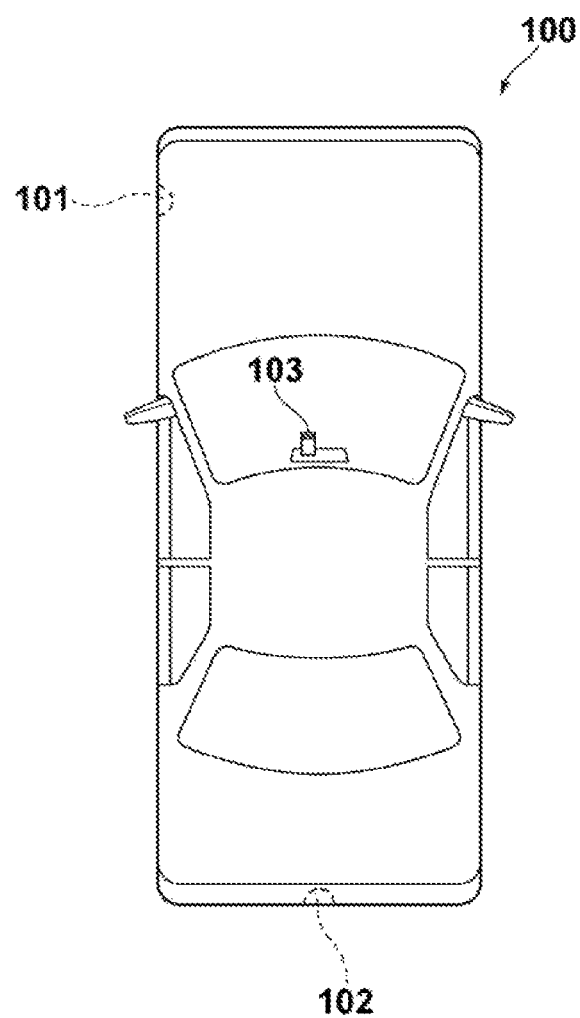
FIG. 19 is a schematic diagram of an imaging apparatus according to an embodiment of the present disclosure.

Next, an imaging apparatus according to an embodiment of the present disclosure will be described. Here, an example in which the embodiment of the imaging apparatus of the present disclosure is applied to vehicle mounted cameras will be described. FIG. 19 illustrates the manner in which vehicle mounted cameras are mounted on an automobile.

In FIG. 19, an automobile 100 is equipped with an externally mounted camera 101 for imaging a blind spot range at the side surface on the side of the passenger seat, an externally mounted camera 102 for imaging a blind spot range at the rear side of the automobile 100, and a internally mounted camera which is mounted on the back surface of the rear view mirror and images the same range as the field of view of a driver. The externally mounted camera 101, the externally mounted camera 102, and the internally mounted camera 103 are imaging apparatuses which are equipped with imaging lenses according to an embodiment of the present disclosure and imaging elements that convert optical images formed by the imaging lenses into electrical signals. The vehicle mounted cameras of the present embodiment (the externally mounted camera 101, the externally mounted camera 102, and the internally mounted camera 103) are equipped with imaging lenses according to the embodiment of the present disclosure. Therefore, the imaging apparatuses are capable of obtaining images having wide angles of view and high image quality.

The present disclosure has been described with reference to the embodiments and Examples. However, the present disclosure is not limited to the above embodiments and Examples, and various modifications are possible. For example, the values of the radii of curvature, the surface distances, the refractive indices, the Abbe's numbers, the aspherical surface coefficients, etc. of each of the lenses are not limited to those exemplified in the above Examples, and may be different values.

In addition, the imaging apparatus according to embodiments of the present disclosure are not limited to vehicle mounted cameras. The imaging apparatus of the present disclosure may be a camera for a portable terminal, a surveillance camera, a digital camera, etc.

What is claimed is:

1. An imaging lens consisting of, in order from an object side to an image side:
a first lens group;
a stop; and
a second lens group having a positive refractive power;
the first lens group consisting of, in order from the object side to the image side:
two negative meniscus lenses having a concave surface toward the image side;
a biconcave lens; and
a biconvex lens;
the second lens group consisting of, in order from the object side to the image side:
a 2A lens group having a positive refractive power as a whole, consisting of a 2-1 positive lens, a 2-2 negative lens, and a 2-3 positive lens; and
a 2B lens group having a positive refractive power as a whole, consisting of a 2-4 positive lens, a 2-5 negative lens, and a 2-6 positive lens; and
Conditional Formula (1) below being satisfied:

$$0.5 < f2B/f2A < 2 \qquad (1)$$

wherein f2B is a focal length of the 2B lens group, and f2A is a focal length of the 2A lens group.

2. An imaging lens as defined in claim 1, wherein:
the 2-3 positive lens is a positive lens having a convex surface toward the image side; and
the 2-4 positive lens is a positive lens having a convex surface toward the object side.

3. An imaging lens as defined in claim 1, wherein:
the 2-2 negative lens and the 2-3 positive lens are cemented together; and
a shape of a coupling surface of the cemented lens is convex toward the object side.

4. An imaging lens as defined in claim 1, wherein:
the 2-5 negative lens and the 2-6 positive lens are cemented together; and
a shape of a coupling surface of the cemented lens is convex toward the object side.

5. An imaging lens as defined in claim 1, in which Conditional Formula (2) below is satisfied:

$$0 < \beta 2B < 0.95 \qquad (2)$$

wherein β2B is a transverse magnification of the 2B lens group.

6. An imaging lens as defined in claim 1, in which Conditional Formula (3) below is satisfied:

$$-1 < f2/f1 < 0.5 \qquad (3)$$

wherein f2 is a focal length of the second lens group, and f1 is a focal length of the first lens group.

7. An imaging lens as defined in claim 1, in which Conditional Formula (4) below is satisfied:

$$0 < (L24f + L23r)/(L24f - L23r) < 0.5 \qquad (4)$$

wherein L24f is a radius of curvature of a surface toward the object side of the 2-4 positive lens, and L23r is a radius of curvature of a surface toward the image side of the 2-3 positive lens.

8. An imaging lens as defined in claim 1, in which Conditional Formula (1-1) below is satisfied:

$$0.7 < f2B/f2A < 1.8 \qquad (1\text{-}1).$$

9. An imaging lens as defined in claim 5, in which Conditional Formula (2-1) below is satisfied:

$$0.2 < \beta 2B < 0.8 \qquad (2\text{-}1).$$

10. An imaging lens as defined in claim 6, in which Conditional Formula (3-1) below is satisfied:

$$-0.8 < f2/f1 < 0.3 \qquad (3\text{-}1).$$

11. An imaging lens as defined in claim 7, in which Conditional Formula (4-1) below is satisfied:

$$0 < (L24f + L23r)/(L24f - L23r) < 0.4 \qquad (4\text{-}1).$$

12. An imaging apparatus equipped with an imaging lens as defined in claim 1.

* * * * *